(12) United States Patent
Endo et al.

(10) Patent No.: US 10,754,553 B2
(45) Date of Patent: Aug. 25, 2020

(54) MEMORY CHIP THAT SUSPENDS TRANSFER PHASE AND RESUMES TRANSFER PHASE

(71) Applicant: Toshiba Memory Corporation, Minato-ku (JP)

(72) Inventors: Shizuka Endo, Yokohama (JP); Riki Suzuki, Yokohama (JP); Yoshihisa Kojima, Kawasaki (JP)

(73) Assignee: Toshiba Memory Corporation, Minato-ku (JP)

( * ) Notice: Subject to any disclaimer, the term of this patent is extended or adjusted under 35 U.S.C. 154(b) by 81 days.

(21) Appl. No.: 16/125,298

(22) Filed: Sep. 7, 2018

(65) Prior Publication Data

US 2019/0087101 A1 Mar. 21, 2019

(30) Foreign Application Priority Data

Sep. 21, 2017 (JP) .................. 2017-181366

(51) Int. Cl.
*G06F 3/06* (2006.01)

(52) U.S. Cl.
CPC .......... *G06F 3/0611* (2013.01); *G06F 3/0647* (2013.01); *G06F 3/0656* (2013.01); *G06F 3/0659* (2013.01); *G06F 3/0679* (2013.01); *G06F 3/0688* (2013.01)

(58) Field of Classification Search
None
See application file for complete search history.

(56) References Cited

U.S. PATENT DOCUMENTS

| 7,562,180 | B2 | 7/2009 | Gyl et al. | |
|---|---|---|---|---|
| 2011/0022781 | A1* | 1/2011 | Wakrat | G06F 12/0246 |
| | | | | 711/103 |
| 2014/0223077 | A1 | 8/2014 | Suzumura | |
| 2014/0380005 | A1* | 12/2014 | Furuya | G06F 3/065 |
| | | | | 711/162 |
| 2015/0186042 | A1 | 7/2015 | Lee | |
| 2016/0012891 | A1 | 1/2016 | Intrater et al. | |
| 2016/0070471 | A1 | 3/2016 | Kojima et al. | |
| 2016/0313946 | A1* | 10/2016 | Zang | G06F 3/0679 |
| 2017/0228167 | A1* | 8/2017 | Manohar | G06F 3/0688 |

* cited by examiner

*Primary Examiner* — Tracy C. Chan
(74) *Attorney, Agent, or Firm* — Oblon, McClelland, Maier & Neustadt, L.L.P.

(57) ABSTRACT

According to one embodiment, a memory system includes a non-volatile memory and a controller. The memory includes a memory cell array. The controller is configured to control a transfer phase in which a command, an address, and first data are transferred to the memory, and a program phase in which the first data is programmed into the memory cell array by the memory after the transfer phase. The controller is configured to suspend the transfer phase after initiating the transfer phase before completion of the transfer phase, then read second data from the memory, and resume the transfer phase after reading of the second data is completed.

20 Claims, 22 Drawing Sheets

FIG.7

| PERIOD | TRANSFER BUFFER 24A | TRANSFER BUFFER 24B |
|---|---|---|
| 201 | EMPTY | EMPTY |
| 202 | NOT-EMPTY | EMPTY |
| 203 | NOT-EMPTY | EMPTY |
| 204 | NOT-EMPTY | NOT-EMPTY |
| 205 | EMPTY | EMPTY |
| 206 | NOT-EMPTY | EMPTY |
| 207 | NOT-EMPTY | EMPTY |
| 208 | NOT-EMPTY | NOT-EMPTY |
| 209 | EMPTY | EMPTY |
| 210 | NOT-EMPTY | EMPTY |
| 211 | NOT-EMPTY | EMPTY |
| 212 | NOT-EMPTY | NOT-EMPTY |

FIG.8

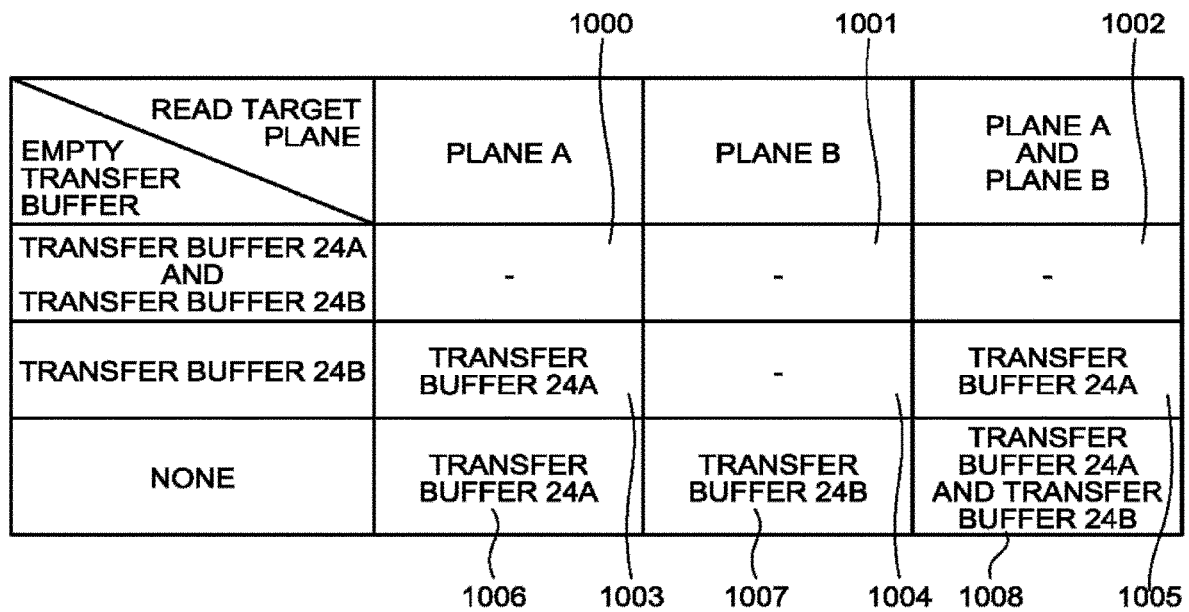

| EMPTY TRANSFER BUFFER \ READ TARGET PLANE | PLANE A | PLANE B | PLANE A AND PLANE B |
|---|---|---|---|
| TRANSFER BUFFER 24A AND TRANSFER BUFFER 24B | - | - | - |
| TRANSFER BUFFER 24B | TRANSFER BUFFER 24A | - | TRANSFER BUFFER 24A |
| NONE | TRANSFER BUFFER 24A | TRANSFER BUFFER 24B | TRANSFER BUFFER 24A AND TRANSFER BUFFER 24B |

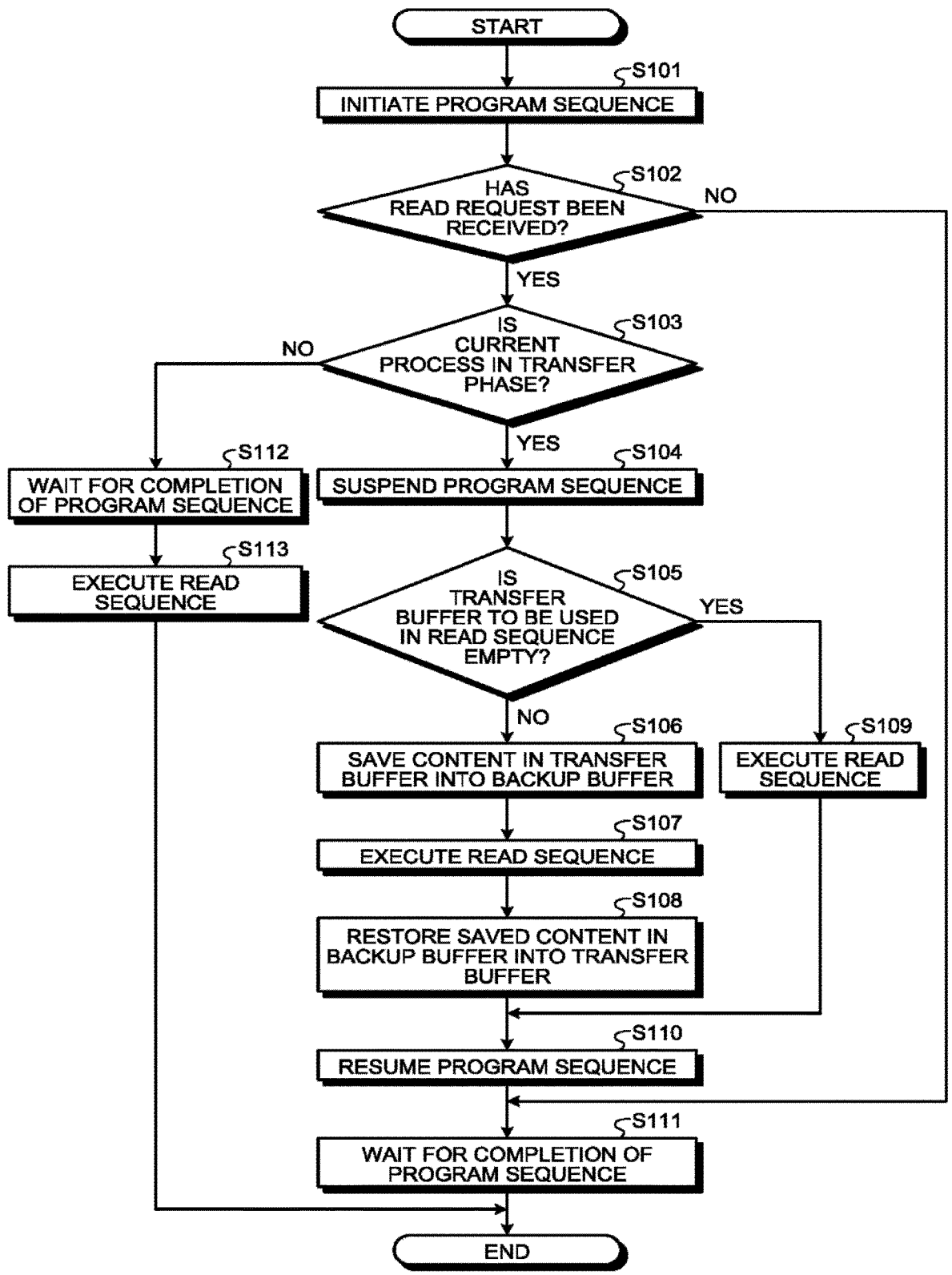

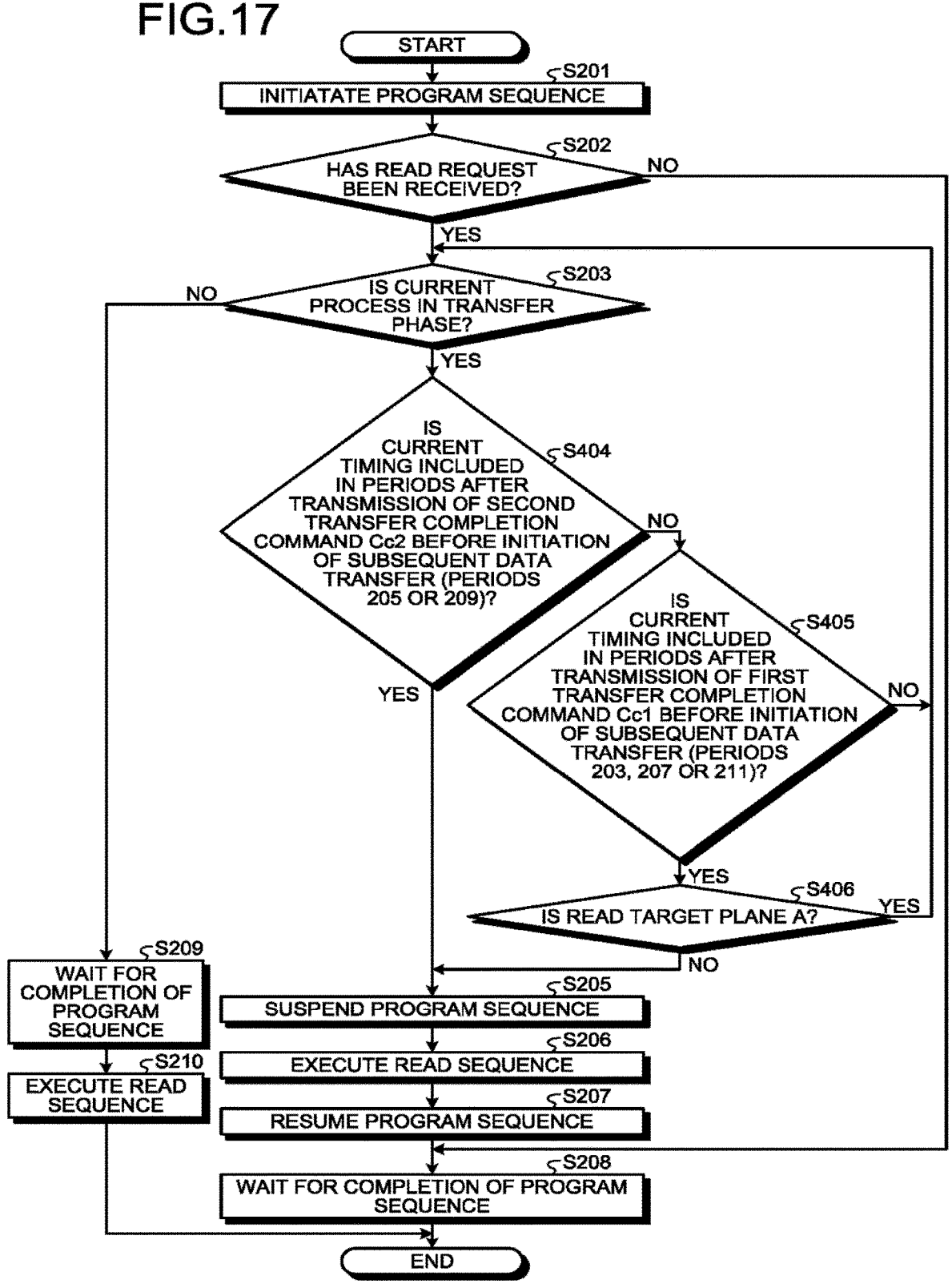

FIG.18

| EMPTY TRANSFER BUFFER \ READ TARGET PLANE | PLANE A | PLANE B | PLANE A AND PLANE B |
|---|---|---|---|
| TRANSFER BUFFER 24A AND TRANSFER BUFFER 24B | TRANSFER BUFFER 24A AND TRANSFER BUFFER 24B | TRANSFER BUFFER 24A AND TRANSFER BUFFER 24B | TRANSFER BUFFER 24A AND TRANSFER BUFFER 24B |
| TRANSFER BUFFER 24B | TRANSFER BUFFER 24A AND TRANSFER BUFFER 24B | TRANSFER BUFFER 24A AND TRANSFER BUFFER 24B | TRANSFER BUFFER 24A AND TRANSFER BUFFER 24B |
| NONE | TRANSFER BUFFER 24A AND TRANSFER BUFFER 24B | TRANSFER BUFFER 24A AND TRANSFER BUFFER 24B | TRANSFER BUFFER 24A AND TRANSFER BUFFER 24B |

FIG.19

| EMPTY TRANSFER BUFFER \ READ TARGET PLANE | PLANE A | PLANE B | PLANE A AND PLANE B |
|---|---|---|---|
| TRANSFER BUFFER 24A AND TRANSFER BUFFER 24B | - | - | - |
| TRANSFER BUFFER 24B | TRANSFER BUFFER 24A | TRANSFER BUFFER 24A | TRANSFER BUFFER 24A |
| NONE | TRANSFER BUFFER 24A AND TRANSFER BUFFER 24B | TRANSFER BUFFER 24A AND TRANSFER BUFFER 24B | TRANSFER BUFFER 24A AND TRANSFER BUFFER 24B |

FIG.20

| EMPTY TRANSFER BUFFER \ READ TARGET PLANE | PLANE A | PLANE B | PLANE A AND PLANE B |
|---|---|---|---|
| TRANSFER BUFFER 24A AND TRANSFER BUFFER 24B | - | - | - |
| TRANSFER BUFFER 24B | TRANSFER BUFFER 24A | TRANSFER BUFFER 24B | TRANSFER BUFFER 24A AND TRANSFER BUFFER 24B |
| NONE | TRANSFER BUFFER 24A | TRANSFER BUFFER 24B | TRANSFER BUFFER 24A AND TRANSFER BUFFER 24B |

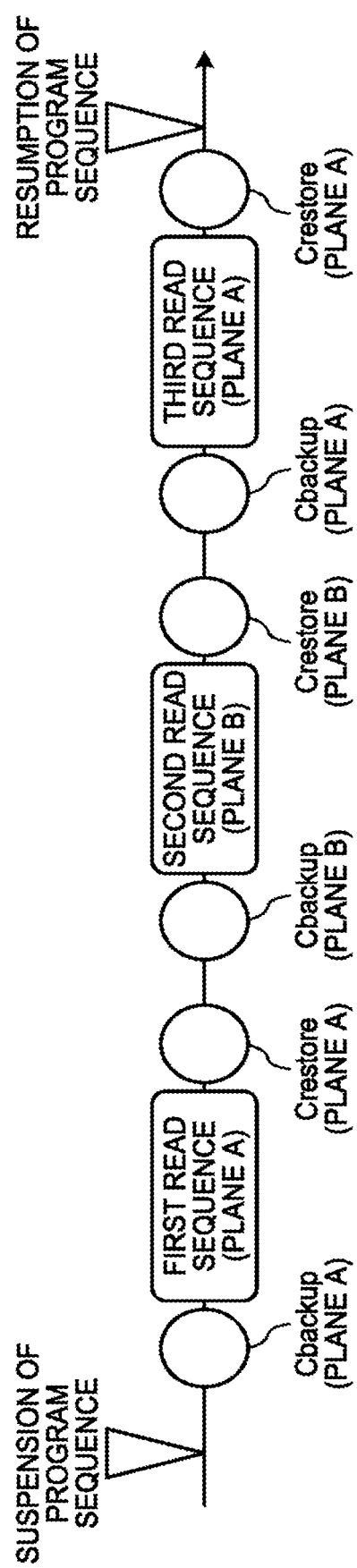

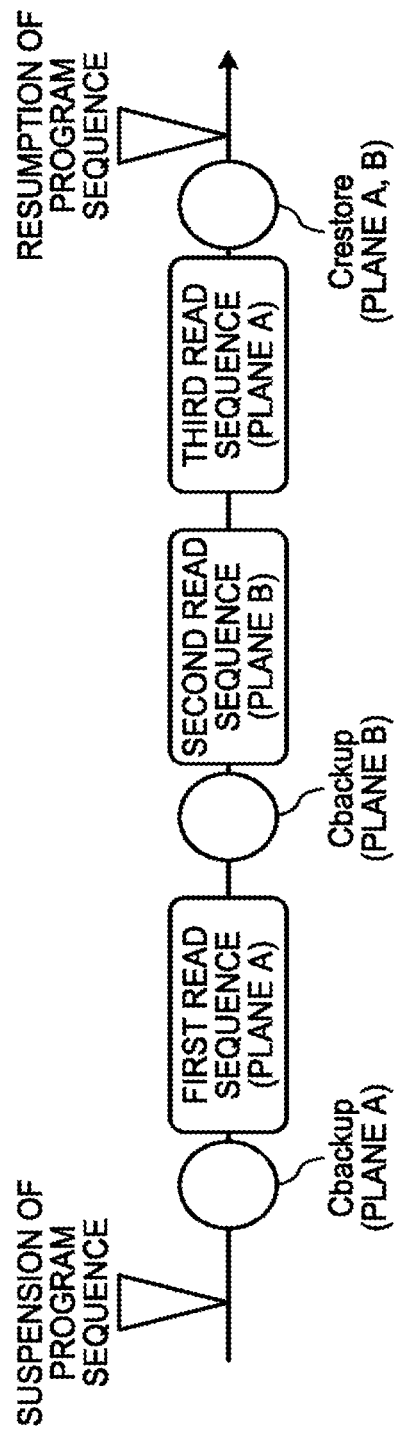

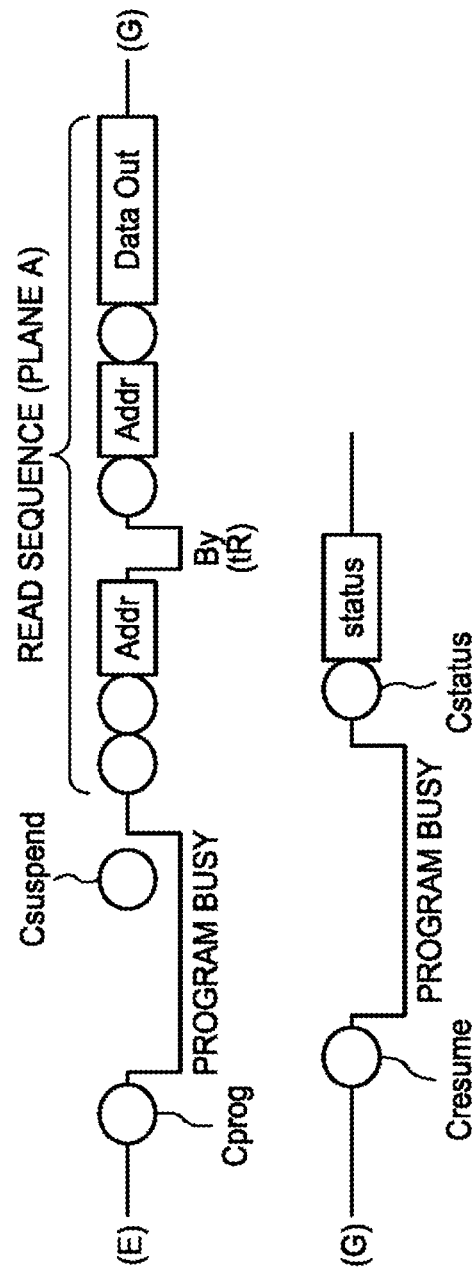

MEMORY CHIP THAT SUSPENDS TRANSFER PHASE AND RESUMES TRANSFER PHASE

CROSS-REFERENCE TO RELATED APPLICATIONS

This application is based upon and claims the benefit of priority from Japanese Patent Application No. 2017-181366, filed on Sep. 21, 2017; the entire contents of which are incorporated herein by reference.

FIELD

Embodiments described here relate generally to a memory system.

BACKGROUND

A memory system includes a non-volatile memory, and a memory controller that executes data transfer between a host and the non-volatile memory. In the memory system, it is required to make latency for a read request from the host as short as possible.

BRIEF DESCRIPTION OF THE DRAWINGS

FIG. 7 is a view illustrating a transfer buffer that is empty in each period according to the first embodiment;

FIG. 8 is a view illustrating the save rule according to the first embodiment;

FIG. 9 is a flowchart illustrating an operation of the memory system according to the first embodiment;

FIG. 17 is a flowchart illustrating an operation of a memory system according to a fourth embodiment;

FIG. 18 is a view illustrating an example of a save rule according to a fifth embodiment;

FIG. 19 is a view illustrating another example of the save rule according to the fifth embodiment;

FIG. 20 is the view illustrating still another example of a save rule according to the fifth embodiment;

FIG. 22 is a schematic view illustrating another example of the control sequence according to the sixth embodiment;

FIG. 23 is a schematic view illustrating still another example of the control sequence according to the sixth embodiment; and FIG. 24 is a schematic view illustrating an example of a control sequence according to an eighth embodiment.

DETAILED DESCRIPTION

In general, according to one embodiment, a memory system includes a non-volatile memory and a controller. The non-volatile memory includes a memory cell array. The controller is configured to control a transfer phase in which a command, an address, and first data are transferred to the non-volatile memory, and a program phase in which the first data is programmed into the memory cell array by the non-volatile memory after the transfer phase. The controller is configured to suspend the transfer phase after initiating the transfer phase before completion of the transfer phase, then read second data from the non-volatile memory. The controller is configured to resume the transfer phase after reading of the second data is completed.

Exemplary embodiments of the memory system will be explained below in detail with reference to the accompanying drawings. The invention is not limited to the following embodiments.

First Embodiment

Figure 1:
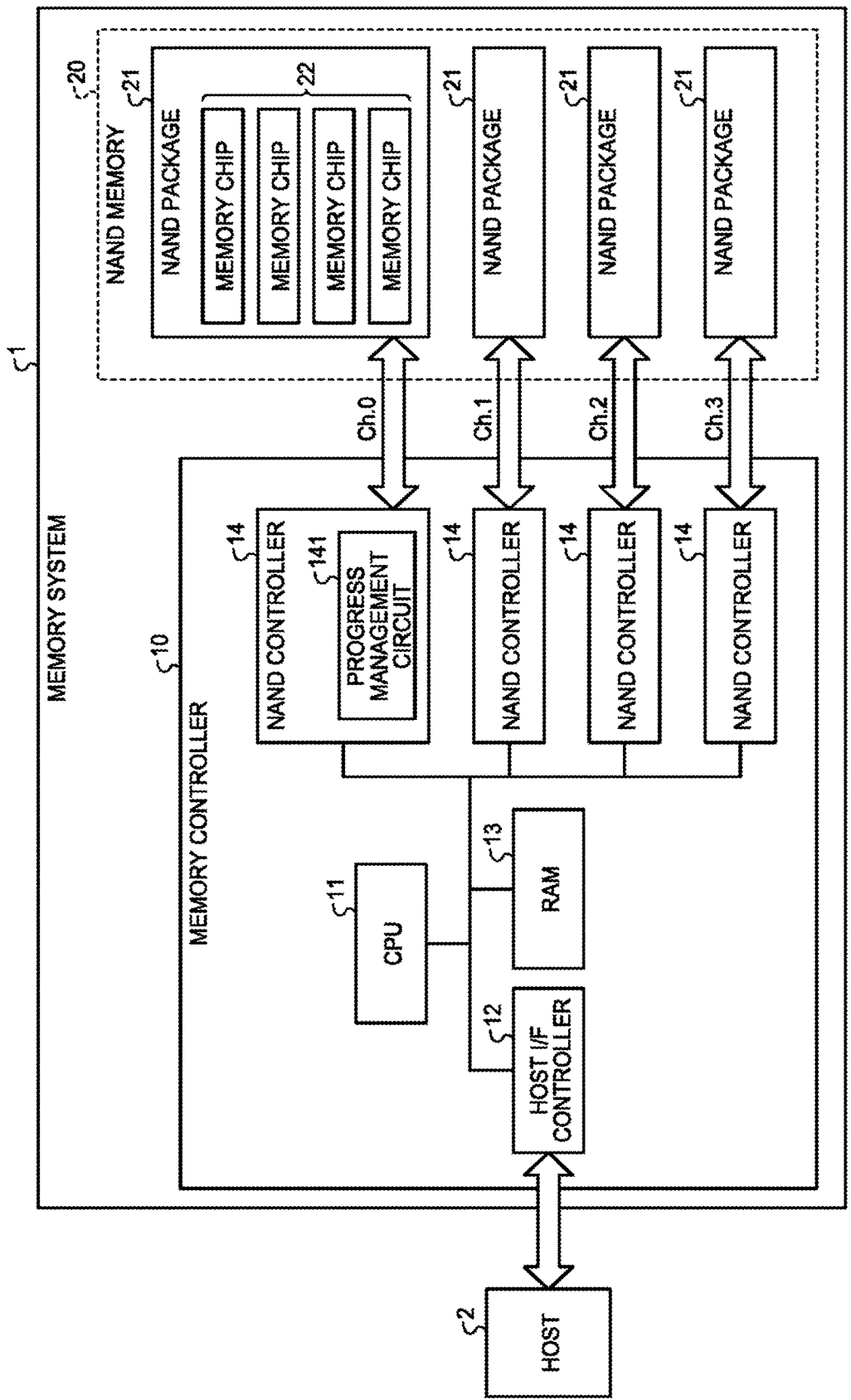
FIG. 1 is a schematic view illustrating a configuration example of a memory system according to a first embodiment.

FIG. 1 is a schematic view illustrating a configuration example of the memory system according to a first embodiment. A memory system 1 can be connected to a host 2. Standards of a communication path between the memory system 1 and the host 2 are not limited to specific standards. For example, serial attached SCSI (SAS), serial ATA (SATA), PCI express (PCIe, registered trademark), and NVM express (NVMe, registered trademark) may be used.

The host 2 may correspond to a personal computer, a personal digital assistant, and a server. The memory system 1 receives access requests (e.g., read requests and write requests) from the host 2. Each of the access requests includes a logical address indicating an access location. The logical address indicates a location in a logical address space that is provided to the host 2 by the memory system 1.

The memory system 1 includes a memory controller 10 and a NAND-type flash memory (hereinafter also referred to as NAND memory) 20.

The memory controller 10 controls the entirety of the memory system 1. Particularly, the memory controller 10 accesses the NAND memory 20 in response to an access request from the host 2.

The NAND memory 20 is an example of a non-volatile memory. The NAND memory 20 includes four packages (hereinafter also referred to as NAND packages 21). Each of the NAND packages 21 includes four memory chips 22. In FIG. 1, the four memory chips 22 included in one of the NAND packages 21 are illustrated, but four memory chips 22 included in each of the other three NAND packages 21 are not illustrated.

The memory controller 10 includes four channels (i.e., ch.0 to ch.3). The NAND packages 21 are respectively connected to the memory controller 10 through corresponding channels. The four memory chips 22 included in the same NAND package 21 are commonly connected to the same channel.

Each of the channels is constituted with a wiring group including an IO signal line and a control signal line. For example, the IO signal line is a signal line through which data, an address, and a command are transmitted and received. For example, the control signal line is a signal line through which a write enable (WEn) signal, a read enable (REn) signal, a command latch enable (CLE) signal, an address latch enable (ALE) signal, a write protect (WPn) signal, and a data strobe (DQS) signal are transmitted and received. Incidentally, the WEn signal, the REn signal, and the WPn signal are operated in a negative logic. The "n" that are attached to the end of each signal name represents the negative logic.

The memory controller 10 controls the channels individually. By simultaneously controlling a plurality of channels, the memory controller 10 simultaneously operates a plurality of the memory chips 22 connected to different channels. The memory controller 10 may execute chip interleave operation. The chip interleave operation represents a process that, in each of the channels, while one memory chip 22 executes a process, another memory chip 22 executes another process, or, while one memory chip 22 executes a process, the memory controller 10 executes data transfer with another memory chip 22.

It should be noted that, the number of the NAND packages 21 included in the memory system 1 is not limited to four. Any number of NAND packages 21 may be included in the memory system 1. In addition, the number of the memory chips 22 included in each of the NAND packages 21 is not limited to four. Any number of memory chips 22 may be included in the NAND package 21. In addition, the number of the channels provided in the memory controller 10 is not limited to four. Any number of channels may be provided in the memory controller 10. In addition, the number of the NAND packages 21, each of which is connected to each of the channels, is not limited to one. Any number of NAND packages 21 may be connected to each of the channels.

Figure 2:
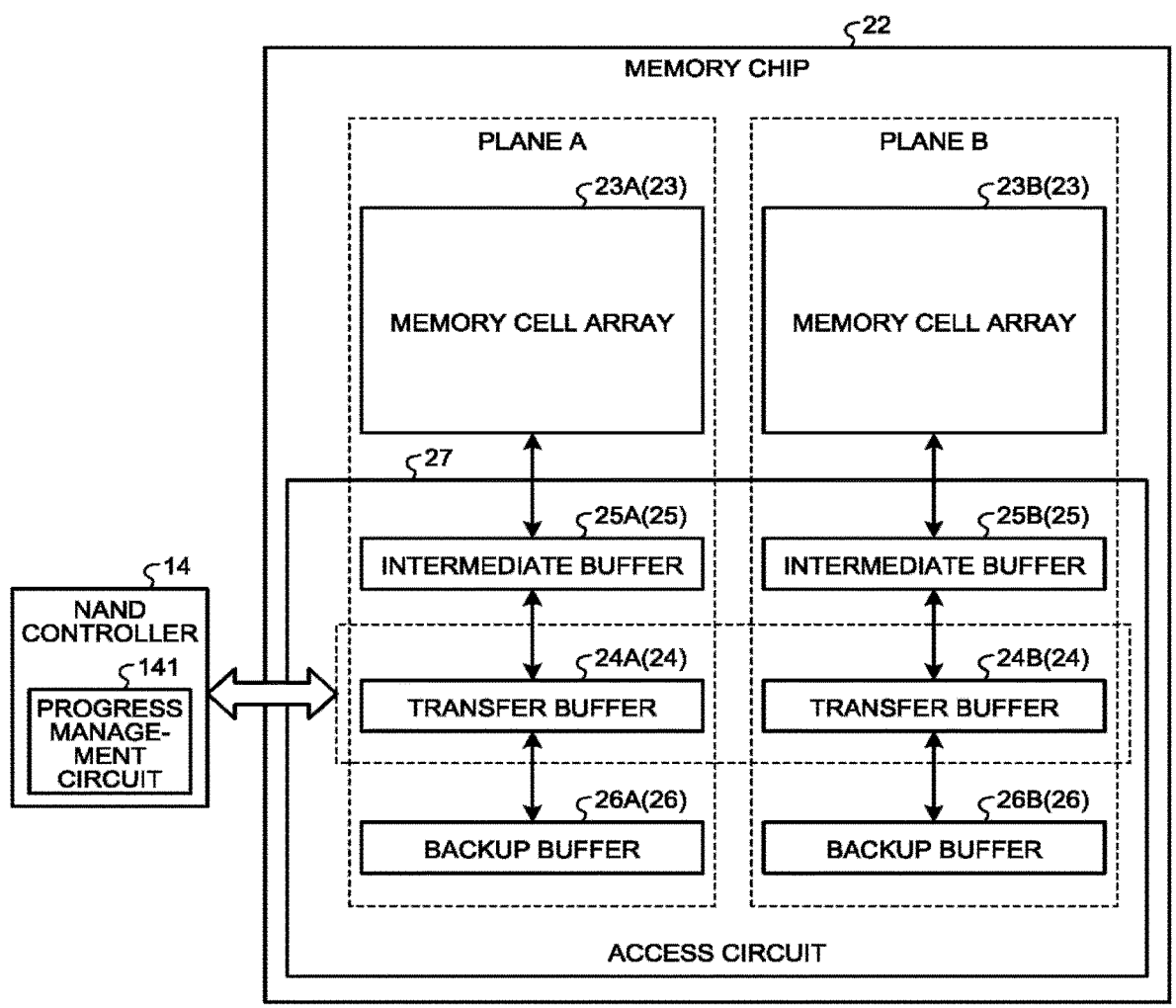
FIG. 2 is a schematic view illustrating a configuration example of a memory chip according to the first embodiment.

FIG. 2 is a schematic view illustrating a configuration example of the memory chips 22 according to the first embodiment. Each of the memory chips 22 includes a memory cell array 23 and an access circuit 27. The memory cell array 23 is divided into two planes (hereinafter also referred to as plane A and plane B). The memory cell array 23A is a sub-array corresponding to the plane A, and the memory cell array 23B is a sub-array corresponding to the plane B. Furthermore, each of the plane A and the plane B includes some parts of the access circuit 27 such as a row decoder, a column decoder, and butters 24, 25, and 26. Accordingly, a program process, a read process, and an erase process may be executed in parallel with respect to the plane A and the plane B.

Each of the planes includes a plurality of blocks. Data stored in one block are collectively erased.

Figure 3:
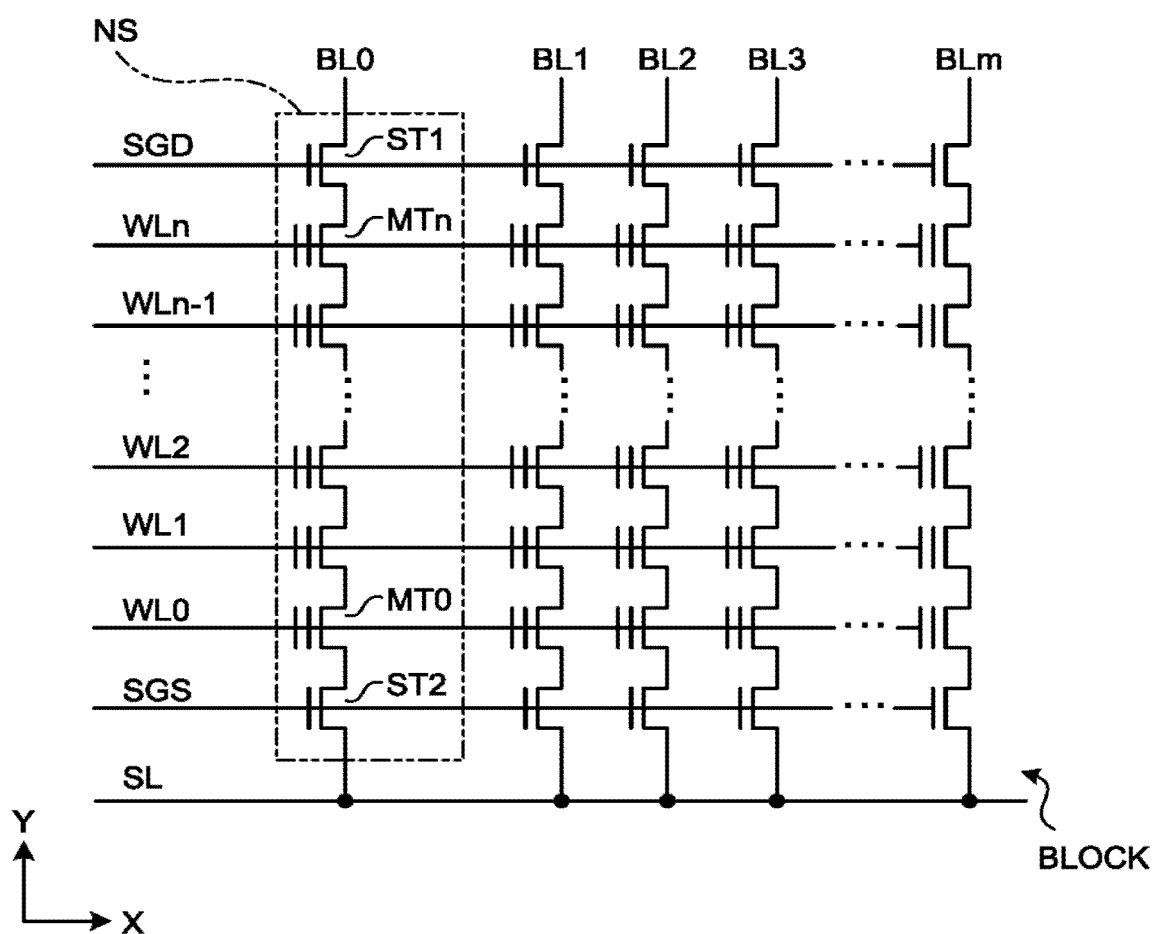
FIG. 3 is a view illustrating a configuration example of a block according to the first embodiment.

FIG. 3 is a view illustrating a configuration example of the block according to the first embodiment. As illustrated in the drawing, each of the blocks includes (m+1) NAND strings NS (m≥0) which are sequentially arranged along an X direction. In selection transistors ST1 included in the (m+1) NAND strings NS, drains are respectively connected to bit lines BL0 to BL(m), and gates are commonly connected to a selection gate line SGD. In addition, in selection transistors ST2, sources are commonly connected to a source line SL, and gates are commonly connected to a selection gate line SGS.

Each memory cell transistor MT is constituted with a metal oxide semiconductor field effect transistor (MOSFET) including a stacked gate structure formed on a semiconductor substrate. The stacked gate structure includes a floating gate that is formed on the semiconductor substrate through a tunnel oxide film, and a control gate electrode that is formed over the floating gate through an inter-gate insulating film. A threshold voltage varies in correspondence with the number of electrons stored in the floating gate. The memory cell transistor MT stores data in correspondence with the threshold voltage. That is, the memory cell transistor MT retains, in the floating gate, a charge of an amount corresponding to data to be stored.

In each of the NAND strings NS, (n+1) memory cell transistors MT are arranged between a source of the selection transistor ST1 and a drain of the selection transistor ST2 in such a manner that respective current paths are connected in series. In addition, control gate electrodes are respectively connected to word lines WL0 to WL(n) in the order from a memory cell transistor MT located on one end of source side to a memory cell transistor MT located on the other end of drain side. Accordingly, a source of a memory cell transistor MT0 connected to a word line WL0 is connected to the drain of the selection transistor ST2, and a drain of a memory cell transistor MT(n) connected to a word line WL(n) is connected to the source of the selection transistor ST1.

Each of the word lines WL0 to WL(n) commonly connects control gate electrodes of the memory cell transistors MT between the NAND strings NS in a block. That is, the control gate electrodes of the memory cell transistors MT in the same row in the block are connected to the same word line WL. In the case of a configuration in which a 1-bit value is retained in each of the memory cell transistors MT, the (m+1) memory cell transistors MT, which are connected to the same word line WL, are treated as one page, and data program and data read are performed per each page.

Each of the memory cell transistors MT may be configured to retain a plural-bit value. For example, in a case where each of the memory cell transistors MT stores an l (l≥2)-bit value, storage capacity per each word line WL is identical to a size of l pages. Here, as an example, a storage mode in which each of the memory cell transistors MT stores 3-bit value will be described. According to the storage mode, data corresponding to three pages is retained in each of the word lines.

Figure 4:
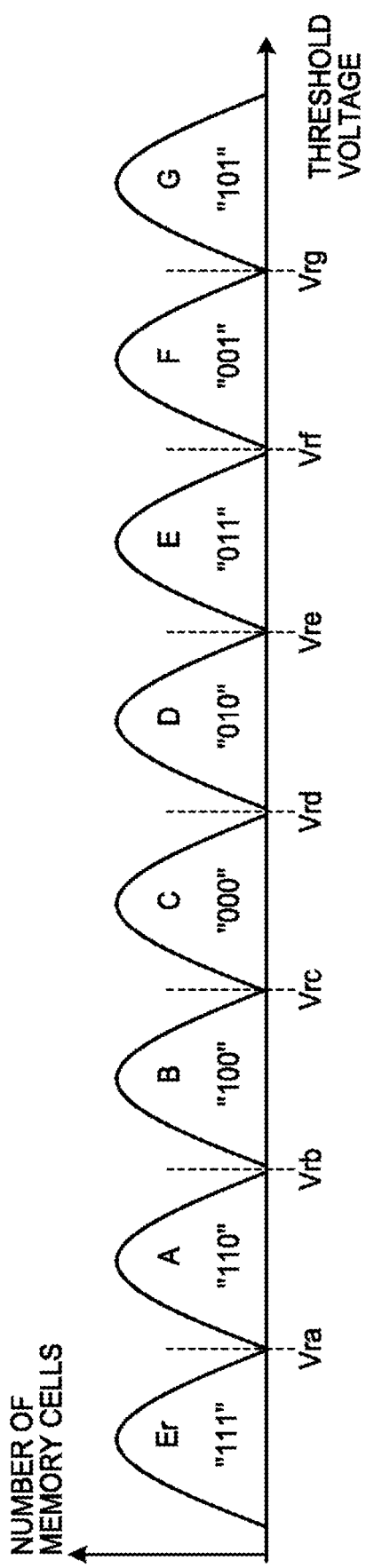
FIG. 4 is a view illustrating an example of data coding and threshold voltage distributions according to the first embodiment.

FIG. 4 is a view illustrating an example of data coding and threshold voltage distributions according to the first embodiment. The horizontal axis represents a threshold voltage of a memory cell. Each of eight lobes in FIG. 4 schematically illustrates a threshold voltage distribution. Each of the eight threshold voltage distributions is referred to as "state". The eight states correspond to a 3-bit data value. According to the example illustrated in the drawing, an Er (erased) state corresponds to a data value of "111", an A state corresponds to a data value of "110", a B state corresponds to a data value of "100", a C state corresponds to a data value of "000", a D state corresponds to a data value of "010", an E state corresponds to a data value of "011", an F state corresponds to a data value of "001", and a G state corresponds to a data value of "101". A leading digit in the data value is referred to as "most significant bit (MSB)". In addition, a trailing digit in the data value is referred to as "least significant bit (LSB)". The correspondence between the states and the data values is not limited thereto.

Each memory cell is controlled so that its threshold voltage corresponds to any one of the eight states. A threshold voltage of a memory cell is set to an Er state through the erase process, and is set to a state corresponding to a data value among the A state to G state through the program process.

In addition, on a memory cell, a state to which its threshold voltage corresponds is determined through comparison between the threshold voltage and several determination voltages in the read process. Then, a data value corresponding to the determined state is read out. Vra, Vrb, Vrc, Vrd, Vre, Vrf, and Vrg in FIG. 4 are an example of the determination voltages.

A group of the LSB in three pages retained in one word line WL is referred to as a lower page. A group of the MSB in the three pages is referred to as an upper page. A group of a bit between the LSB and the MSB in the three pages is referred to as a middle page.

Returning to FIG. 2, the access circuit 27 executes the program process, the read process, and the erase process on the memory cell array 23 under a control by the memory controller 10. The access circuit 27 may include a sense amplifier, a column decoder, and a row decoder.

The access circuit 27 includes transfer buffers 24 (24A and 24B), intermediate buffers 25 (25A and 25B), and backup buffers 26 (26A and 26B). The transfer buffer 24A, the intermediate buffer 25A, and the backup buffer 26A are buffers belonging to the plane A, and are used in the read process and the program process on the memory cell array 23A. The transfer buffer 24B, the intermediate buffer 25B, and the backup buffer 26B are buffers belonging to the plane B, and are used in the read process and the program process on the memory cell array 23B.

The transfer buffer 24A is a buffer for data transfer between the memory controller 10 and the memory chip 22. The access circuit 27 receives, in the transfer buffer 24A, data transmitted from the NAND controller 14 to the memory cell array 23A as a program destination. In addition, the access circuit 27 stores, into the transfer buffer 24A, data read out from the memory cell array 23A, and the NAND controller 14 acquires the data stored in the transfer buffer 24A through a Data Out operation.

The intermediate buffer 25A is a memory area used as a working area in the read process and the program process by the memory cell array 23A.

For example, in the program process, a part or the entirety of three-page data, which is sequentially input to the transfer buffer 24A, is temporarily stored into the intermediate buffer 25A. In addition, intermediate data is stored into the intermediate buffer 25A. The intermediate data is generated in calculating, based on the three-page data, threshold voltages which are to be set to memory cells.

In the read process, a threshold voltage of each memory cell connected to a word line WL which is a read process target in the memory cell array 23A is compared with predetermined determination voltages. The comparison result is stored in the intermediate buffer 25A. In addition, intermediate data generated in the calculating a data value from the comparison result is stored in the intermediate buffer 25A. The data value obtained through the calculation is stored in the transfer buffer 24A. The NAND controller 14 acquires the data value stored in the transfer buffer 24A through a Data Out operation.

The transfer buffer 24B is a buffer for data transfer between the memory controller 10 and the memory chip 22. The access circuit 27 receives, in the transfer buffer 24B, data transmitted from the NAND controller 14 to the memory cell array 23B as a program destination. In addition, the access circuit 27 stores, into the transfer buffer 24B, data read out from the memory cell array 23B, and the NAND controller 14 acquires the data stored in the transfer buffer 24B through a Data Out operation.

As in a case where the intermediate buffer 25A is used as a working area in the read process and the program process on the memory cell array 23A, the intermediate buffer 25B is used as a working area in the read process and the program process on the memory cell array 23B.

In FIG. 2, one intermediate buffer 25 is illustrated for each plane. Each plane may include any number of intermediate buffers for the calculation method in the program process and the read process.

The backup buffer 26 will be described later.

Returning to FIG. 1, the memory controller 10 includes a central processing unit (CPU) 11, a host interface controller (host I/F controller) 12, a random access memory (RAM) 13, and the four NAND controllers 14. The memory controller 10 may be constituted as a system on a chip (SoC). The memory controller 10 may be constituted by a plurality chips.

The RAM 13 is a memory that functions as a cache, a buffer, and a working area when the memory controller 10 operates. For example, data received from the host 2 is stored into the RAM 13 before being transmitted to the NAND memory 20. Data read out from the NAND memory 20 is also stored into the RAM 13 before being transmitted to the host 2. The RAM 13 may be constituted by any kind of memory. For example, the RAM 13 may be constituted by a dynamic random access memory (DRAM), a static random access memory (SRAM), or a combination thereof. Furthermore, the DRAM or the SRAM, which constitutes the RAM 13, may be provided at the outside of the memory controller 10.

The four NAND controllers 14 respectively control channels different from each other. Each of the NAND controllers 14 executes a control sequence to access, under instruction from the CPU 11, a memory chip 22 in a NAND package 21 connected thereto through a corresponding channel. Each of the NAND controllers 14 includes progress management circuit 141 that tracks the progress of the control sequence. In FIG. 1, the progress management circuit 141 provided in one of the NAND controllers 14 is illustrated, but progress management circuits 141 provided in the other three NAND controllers 14 are not illustrated.

The host interface controller 12 controls transmission and reception of information (i.e., access requests, responses, and data) between the host 2 and the memory controller 10. For example, the host interface controller 12 receives an access request transmitted from the host 2. In addition, the host interface controller 12 stores data, which is received from the host 2, into the RAM 13. In addition, the host interface controller 12 transmits data, which is read out from the NAND memory 20 and is stored in the RAM 13, to the host 2.

The CPU 11 is a processor that operates on the basis of a program (a firmware program) that is embedded in the memory system 1. For example, the firmware program is stored at a predetermined location in the NAND memory 20. The CPU 11 loads, in the RAM 13, the firmware program from the NAND memory 20 at a start-up of the memory system 1. The CPU 11 executes the firmware program loaded in the RAM 13.

The CPU 11 controls, for example, data transfer between the host 2 and the NAND memory 20 in accordance with the firmware program. The CPU 11 may cause a part or all of the four NAND controllers 14 to execute a control sequence corresponding to the access request received from the host 2.

Here, a control sequence (hereinafter also referred to as program sequence) of the program process will be described.

Figure 5:
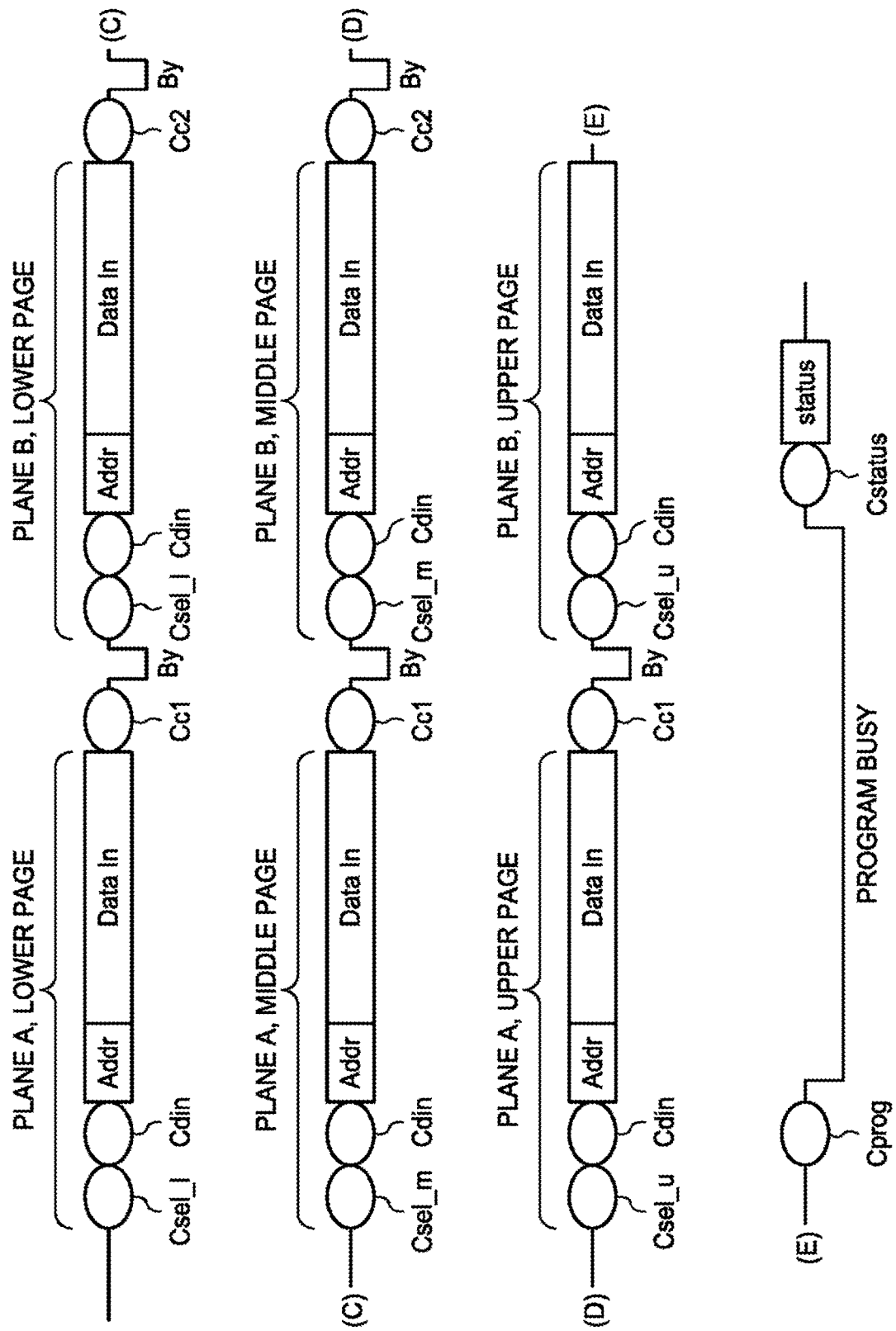
FIG. 5 is a timing chart illustrating an example of a program sequence according to the first embodiment.

FIG. 5 is a timing chart illustrating an example of the program sequence according to the first embodiment. Here, FIG. 5 illustrates an example of the program sequence in a case where three-page data is programmed to the two memory cell arrays 23A and 23B. In FIG. 5, one program sequence is divided into four parts, and the four parts are drawn in chronological order in a direction from an upper row to a lower row. That is, a left end (C) of a part drawn at the second uppermost row continues from a right end (C) of a part drawn at the uppermost row. A left end (D) of a part drawn at the third uppermost row continues from (D) a right end (D) of the part drawn at the second uppermost row. A left end (E) of a part drawn at the lowest row continues from a right end (E) of the part drawn at the third uppermost stage. In FIG. 5, a state of an IO signal line and a state of Ry/Byn signal line are not illustrated separately. The signal Ry/Byn is also operated in the negative logic.

According to the program sequence, from a NAND controller 14, data to be programmed into a lower page of the memory cell array 23A, data to be programmed into a lower page of the memory cell array 23B, data to be programmed into a middle page of the memory cell array 23A, data to be written into a middle page of the memory cell array 23B, data to be programmed into an upper page of the memory cell array 23A, and data to be programmed into an upper page of the memory cell array 23B are transferred in this order to a target memory chip 22.

Hereinafter, the memory cell array 23A as a data program/read target may be described simply as "plane A". That is, for example, "data is programmed to the plane A" represents that "data is programmed into a sub-array corresponding to the plane A, that is, the memory cell array 23A". In addition, "plane A is a read source" represents that "a sub-array corresponding to the plane A, that is, the memory cell array 23A is a read source". Similarly, the memory cell array 23B as a data program/read target may be described simply as "plane B".

In addition, data to be programmed into the memory cell array 23A may be referred to as data for plane A. Similarly, data to be programmed in the memory cell array 23B may be referred to as data for plane B. In addition, data to be programmed into a lower page may be referred to as data for lower page. Similarly, data to be programmed into a middle page may be referred to as data for middle page, and data to be programmed into an upper page may be referred to as data for upper page.

Before transfer of each data, the NAND controller 14 transmits a page selection command Csel (Csel_1, Csel_m, or Csel_u) to designate a page among lower/middle/upper pages, and a data input command Cdin to indicate input of data, to an access circuit 27 of the memory chip 22. Here, Csel_1 is a command to designate a lower page, Csel_m is a command to designate a middle page, and Csel_u is a command to designate an upper page.

After transmission of the data input command Cdin, the NAND controller 14 transfers an address Addr, and transmits data (Data In). The address Addr includes an address that designates a plane, a block, and a word line, and a start column address. After transfer of data for plane A, the NAND controller 14 transmits a first completion command Cc1. The first completion command Cc1 is a command for notifying a completion of transfer of data for one plane.

After receiving the first completion command Cc1, the access circuit 27 temporarily transitions the Ry/Byn signal from a ready state to a busy state (By), and switches the transfer buffer 24, which is to receive data thereto, from the transfer buffer 24A to the transfer buffer 24B.

After the Ry/Byn signal returns to the ready state after transmission of the first completion command Cc1, the NAND controller 14 transmits a page selection command Csel to designate the same page as the page designated when the data for plane A is previously transmitted, a data input command Cdin, and an address Addr, and transfers data for plane B (Data In).

After transfer of the data for plane B, the NAND controller 14 transmits a second completion command Cc2. The second completion command Cc2 is a command for notifying a completion of transfer of data for all the target planes for programming.

When receiving the second completion command Cc2, the access circuit 27 acquires data stored in each of the transfer buffers 24A and 24B, into each of the intermediate buffers 25A and 25B. When acquiring the data into each of the intermediate buffers 25A and 25B, the access circuit 27 temporarily transitions the Ry/Byn signal from the ready state to the busy state.

When acquiring the data stored in the transfer buffer 24 to the intermediate buffer 25, the access circuit 27 may perform predetermined calculation with respect to the data.

After the Ry/Byn signal returns to the ready state after transmission of the second completion command Cc2, the NAND controller 14 transfers data to be programmed in a subsequent page. For example, after transfer of data for lower page of the planes A and B is completed, the NAND controller 14 transfers data for middle page of the planes A and B. After transfer of the data for middle page of the planes A and B is completed, the NAND controller 14 transfers data for upper page of the planes A and B.

After transfer of last data in the program sequence (data for upper page of the plane B) is completed, the NAND controller 14 transmits a program execution command Cprog for executing a program instead of the second completion command Cc2.

Upon receiving the program execution command Cprog, the access circuit 27 calculates a setting value of a threshold voltage for each memory cell connected to a word line WL of a program destination, on the basis of the data for lower page and the data for middle page which have been acquired in the intermediate buffer 25, and the data for upper page which has been stored in the transfer buffer 24. Then, the access circuit 27 raises, up to the setting value, the threshold voltage for said each memory cell. After receiving the program execution command Cprog, the access circuit 27 temporarily retains the Ry/Byn signal in the busy state until raising of the threshold voltage for each memory cell is completed. The busy state at programming may be referred to as a program busy state.

After the Ry/Byn signal returns from the program busy state to the ready state, the NAND controller 14 transmits a command Cstatus for reading out status information. The access circuit 27 outputs, to the NAND controller 14, the status information indicating success or failure of the programming.

A sequence from the head of the program sequence to transmission of the program execution command Cprog constitutes a transfer phase, in which data, a command, an address, and the like are transferred to the access circuit 27. A sequence from the transmission of the program execution command Cprog to the response of the status information constitutes a program phase, in which the access circuit 27 programs data in each plane.

In this embodiment, even after the program sequence is started, the memory controller 10 suspends the program sequence in the transfer phase and executes a control sequence of the read process (read sequence). The memory controller 10 resumes the program sequence after completion of the read sequence.

Here, in a case where a transfer buffer 24 contains target data for programming having been input by the program sequence and the transfer buffer 24 is used in the read process, the data will be overwritten by data read out from the memory cell array 23 by the read process. That is, the data of a programming target, which has been stored in the transfer buffer 24, will be lost. In this embodiment, in a case where target data for programming exists in a transfer buffer 24 and the transfer buffer 24 is to be used in a read process, the access circuit 27 saves the data into a backup buffer 26.

In addition, after the read sequence is completed, the access circuit 27 restores the data in the backup buffer 26 to the transfer buffer 24.

The transfer buffer 24 is reset, for example, after data stored in the transfer buffer 24 is acquired in the intermediate buffer 25 before new incoming data is input therein. Invalid data is set to the transfer buffer 24 through the resetting. After the resetting, in a case where the new incoming data is input to a part of the transfer buffer 24, the invalid data is retained in a region in which the new incoming data has not been retained, of the transfer buffer 24. In this embodiment, as an example, it is assumed that the access circuit 27 saves the entirety of data including the invalid data, which is retained in the transfer buffer 24, into the backup buffer 26. The entirety of data retained in the transfer buffer 24 is simply referred to as a content. That is, in this embodiment, the access circuit 27 saves a content of the transfer buffer 24 into the backup buffer 26. A content retained in the transfer buffer 24 may mean a content retained in the transfer buffer 24A or 24B, or a content retained in both of the transfer buffers 24A and 24B. "An entirety of (data retained in) the transfer buffer 24" may mean (a content retained in) transfer buffers of all the planes implemented in the memory chip, or (a content retained in) transfer buffers of all the target planes for programming. Similar interpretations are valid for other buffers, such as the internal buffers 25 and the backup buffers 26.

The invalid data may be generated by other processes than the resetting. For example, after data stored in the transfer buffer 24 is acquired in the intermediate buffer 25, old data may be left in the transfer buffer 24, and new incoming data may be input to the transfer buffer 24 in which the old data, which can be considered as the invalid data, is left.

It should be noted that the access circuit 27 may not have to save the entirety data stored in the transfer buffer 24 into the backup buffer 26. The access circuit 27 is only required to save at least valid data (data excluding the invalid data) among a content retained in the transfer buffer 24 into the backup buffer 26.

The save and restoration may include transfer. For example, the access circuit 27 transfers a content in the transfer buffer 24 to the backup buffer 26 in the save process, and transfers the content in the backup buffer 26 to the transfer buffer 24 in the restoration process. The access circuit 27 may copy the content in the transfer buffer 24 to the backup buffer 26 in the save process, and may copy the content in the backup buffer 26 to the transfer buffer 24 in the restoration process. In another example, the access circuit 27 may exchange a content of the transfer buffer 24 and a content of the backup buffer 26 with each other in save and restoration process.

Alternatively, the save and restoration processes may be realized by swapping the roles of two buffers. For example, two buffers are prepared, and the memory controller 10 uses one buffer as the transfer buffer 24, and regards the other buffer as the backup buffer 26. In the save process, the memory controller 10 does not perform data transfer between the two buffers, and swaps the roles of the two buffers. That is, the memory controller 10 regards the one buffer as the backup buffer 26 and regards the other buffer as the transfer buffer 24. In the restoration process, the memory controller 10 restores the roles of the two buffers to the original roles. In this manner, the save and restoration processes may be realized without data transfer.

The memory controller 10 may process (i.e., modify) a content during the save and restoration processes. For example, the memory controller 10 may process a content during the save process, and may reverse the saved processed content to the original content during the restoration process.

Figure 6:
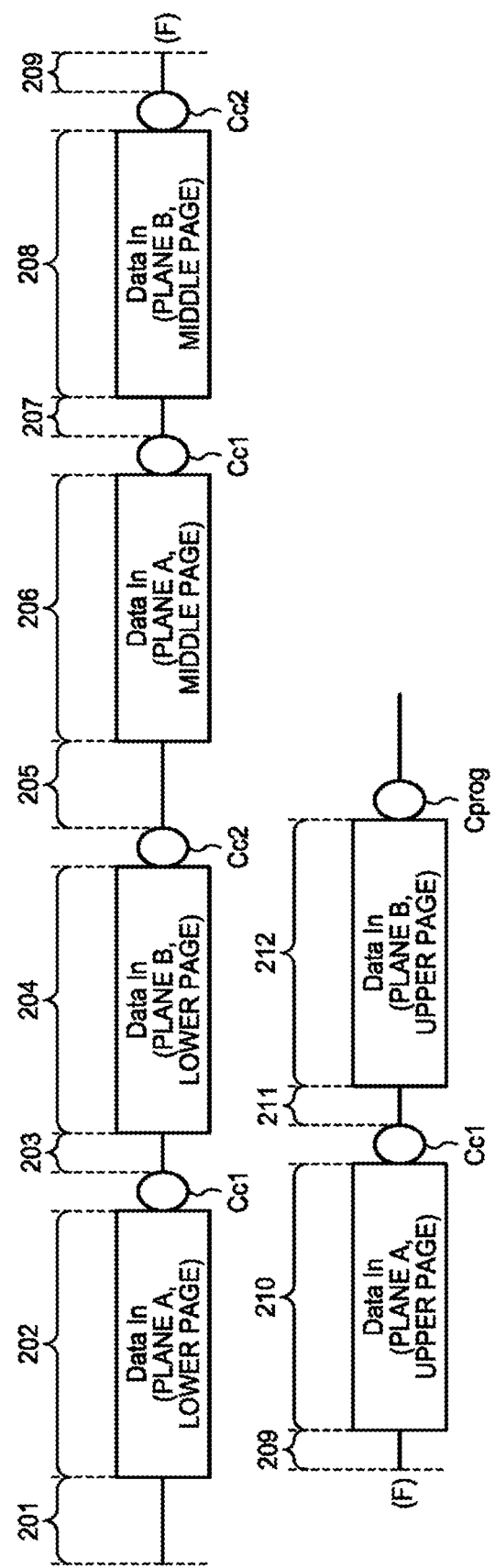
FIG. 6 is a view illustrating an example in which a program sequence is divided into several periods to explain a save rule according to the first embodiment.

Next, a save rule according to the first embodiment will be described with reference to FIGS. 6 to 8. FIG. 6 is a view illustrating an example in which the program sequence is divided into several periods to explain the save rule according to the first embodiment. In FIG. 6, page selection commands Csel, data input commands Cdin, and addresses Addr are not illustrated. In addition, in FIG. 6, one program sequence is divided into two parts, and the two parts are drawn in chronological order. That is, a left end (F) of a part drawn at the lower row continues from a right end (F) of a part drawn at the upper row.

FIG. 7 is a table indicating whether or not the transfer buffer 24 is empty for each period of the program sequence illustrated in FIG. 6.

FIG. 8 is a view illustrating the save rule according to the first embodiment. FIG. 8 illustrates a relationship between plane(s) that are read sources, transfer buffer(s) 24 that are empty, and transfer buffer(s) 24 for which the save process is executed.

For example, as illustrated in FIG. 7, in a period before initiation of transfer of data for lower page of the plane A after initiation of the program sequence (a period 201 in FIG. 6), and periods after execution of the second completion command Cc2 before initiation of transfer of data for a subsequent plane (plane A) (periods 205 or 209 in FIG. 6), both of the transfer buffer 24A and the transfer buffer 24B are empty. In a case where both of the transfer buffer 24A and the transfer buffer 24B are empty, the memory controller 10 does not execute the save process (refer to cells 1000 to 1002 in FIG. 8).

Here, "transfer buffer 24 is empty" represents that data having been input from the memory controller 10 by the program sequence does not exist in the transfer buffer 24.

Furthermore, the following implementation may be considered. That is, when the access circuit 27 acquires data from the transfer buffer 24 into the intermediate buffer 25, the original data stays in the transfer buffer 24 after the acquisition. In this case, "transfer buffer 24 is empty" represents that data input from the memory controller 10 in the program sequence does not exist in the transfer buffer 24 or not-acquired data does not remain in the transfer buffer 24.

As illustrated in FIG. 7, in periods before initiation of transfer of data for plane B after initiation of transfer of data for plane A (periods 202, 203, 206, 207, 210, or 211 in FIG. 6), the transfer buffer 24A is not empty, and the transfer buffer 24B is empty. In this case, the memory controller 10 determines whether to execute the save process in correspondence with the transfer buffer 24 to be used in the read sequence. In a case where the plane B is a read source, the memory controller 10 does not execute the save process (refer to a cell 1004 in FIG. 8). In a case where the plane A is a read source, or in a case where both of the plane A and the plane B are read sources, the memory controller 10 saves only a content of the transfer buffer 24A (refer to a cell 1003 and a cell 1005 in FIG. 8).

As illustrated in FIG. 7, in a period before transmission of the second completion command Cc2 or the program execution command Cprog, after initiation of transfer of data for plane B (periods 204, 208, or 212 in FIG. 6), both of the transfer buffer 24A and the transfer buffer 24B are not empty. In this case, the memory controller 10 saves only a content of the transfer buffer 24 to be used in the read sequence (refer to cells 1006 to 1008 in FIG. 8).

FIG. 9 is a flowchart illustrating an operation of the memory system 1 according to the first embodiment. First, the memory controller 10 initiates a program sequence (S101).

In S101, for example, the CPU 11 instructs the NAND controller 14 to execute the program sequence. In the instruction of the program sequence, the CPU 11 designates, as data of a program target, three pieces of data to be programmed respectively to a lower page, a middle page, and an upper page of one word line WL of the plane A, and three pieces of data to be programmed respectively to a lower page, a middle page, and an upper page of one word line WL of the plane B. The data of the program target is stored in the RAM 13 before initiation of the program sequence. The NAND controller 14, which is instructed to execute the program sequence, initiates the program sequence for programming the data of the program target into the NAND memory 20.

After initiation of the program sequence, when the memory controller 10 receives a read request from the host 2 (S102, Yes), the memory controller 10 determines whether or not the current process is in the transfer phase (S103). In a case where the current process is in the transfer phase (S103, Yes), the memory controller 10 suspends the program sequence (S104).

In the NAND controller 14, the progress management circuit 141 tracks, for example, by counting the amount of transferred data or the column addresses, progress of the program sequence. The progress of the program sequence may include progress of data transfer or a plane that is a program destination of the data transfer. That is, the NAND controller 14 recognizes whether or not the current process in the program sequence is in the transfer phase. Upon detecting reception of the read request from the host 2, the CPU 11 instructs the NAND controller 14 to execute the read sequence in correspondence with the read request. At timing of receiving the instruction to execute the read sequence, the NAND controller 14, in a case where the current process is in the transfer phase, suspends the program sequence in S104.

After suspending the program sequence, the memory controller 10 determines whether or not the transfer buffer 24 to be used in the read sequence is empty (S105). In a case where the transfer buffer 24 to be used in the read sequence is not empty (S105, No), the memory controller 10 saves, to the backup buffer 26, a content of the transfer buffer 24 to be used in the read sequence (S106).

In S106, the NAND controller 14 transmits a backup command to the NAND memory 20. The backup command may designate a plane or planes. The backup command designates both of the plane A and the plane B. The access circuit 27 saves a content of the transfer buffer 24 belonging to each plane designated by the backup command into a corresponding backup buffer 26.

After completion of the saving, the memory controller 10 executes the read sequence (S107), and then restores the content, which has been saved in the backup buffer 26, to the transfer buffer 24 (S108). In S108, the NAND controller 14 transmits a restore command to the NAND memory 20. The restore command may designate a plane or planes. The restore command may designate both of the plane A and the plane B. The access circuit 27 restores the content of the backup buffer 26 belonging to each plane designated by the restore command to a corresponding transfer buffer 24.

On the other hand, in a case where the transfer buffer 24 to be used in the read sequence is empty (S105, Yes), the memory controller 10 executes the read sequence without executing the save/restoration processes (S109).

For example, in S105, the NAND controller 14 determines whether or not the transfer buffer 24 to be used in the read sequence is empty on the basis of a plane that is a read source, and progress of the program sequence. In a case where the transfer buffer 24 to be used in the read sequence is not empty, the NAND controller 14 executes the save/restoration processes of a content in the transfer buffer 24 before and after the read sequence in S106 to S108. In a case where the transfer buffer 24 to be used in the read sequence is empty, in S109, the NAND controller 14 executes the read sequence without executing the save/restoration processes of the content.

After S108, or after S109, the memory controller 10 resumes the program sequence (S110). For example, the NAND controller 14 resumes the data transfer at the point of suspending the program sequence.

When the program sequence is completed (S111), a series of operations are completed. In a case where the read request is not received (S102, No), the memory controller 10 continues the program sequence, and when the program sequence is completed (S111), a series of operations are completed.

When receiving the read request, in a case where the current process is not in the transfer phase (S103, No), that is, the process is in the program phase, the memory controller 10 continues the program sequence. When the program sequence is completed (S112), the memory controller 10 executes the read sequence (S113), and a series of operations are completed.

As described above, in the first embodiment, the memory controller 10 suspends the program sequence at any timing in the transfer phase and then execute a read sequence. When suspending the program sequence, in a case where the transfer buffer 24 to be used in the read sequence is empty, the memory controller 10 does not execute the save process of a content of the transfer buffer 24, and in a case where the transfer buffer 24 to be used in the read sequence is not empty, the memory controller 10 executes the save process of the content of the transfer buffer 24.

Next, an example of a control sequence in executing a read sequence by suspending the program sequence will be described.

Figure 10:
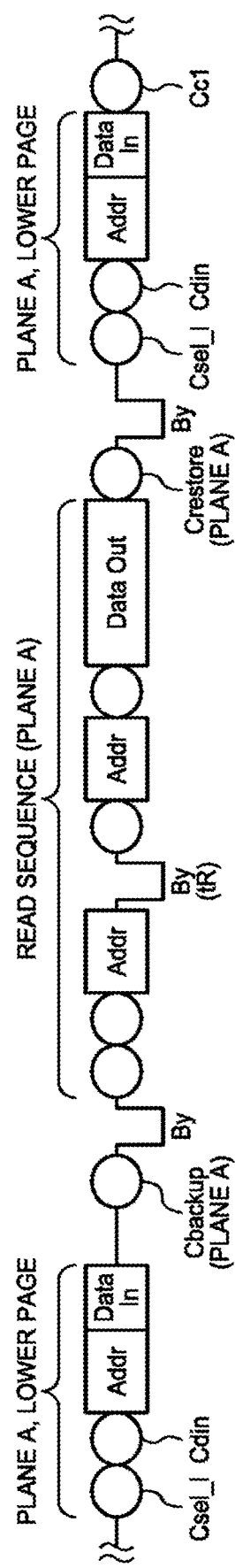
FIG. 10 is a view illustrating an example of a control sequence according to the first embodiment in a case of performing data save/restoration.

FIG. 10 is a view illustrating an example of the control sequence in performing the save/restoration processes. FIG. 10 illustrates the control sequence in a case where a read sequence, in which the plane A is a read source, is executed in transfer of data for lower page of the plane A (that is, the period 202 in FIG. 6).

As illustrated in FIG. 10, the memory controller 10 suspends transfer of data (Data In) for lower page of the plane A, and transmits a backup command Cbackup. Here, the backup command Cbackup includes information that designates the plane A. The access circuit 27 saves a content of the transfer buffer 24A, which is the transfer buffer 24 corresponding to the plane A, into the backup buffer 26A.

The memory controller 10 executes a read sequence in which the plane A is a read source after transmission of the backup command Cbackup. After the read sequence is completed, the memory controller 10 transmits a restore command Crestore. The restore command Crestore includes information that designates the plane A. The access circuit 27 restores the content of the backup buffer 26A, which is the backup buffer 26 corresponding to the plane A, to the transfer buffer 24A.

A state of the transfer buffer 24A returns to a state before the saving due to the restoration of the content of the backup buffer 26A. The memory controller 10 resumes the program sequence after transmitting the restore command Crestore. After resuming the program sequence, the memory controller 10 transmits a page selection command Csel_1, a data input command Cdin, and an address Addr. For example, the address Addr includes a column address indicating a part of the data for lower page of the plane A that has not yet been transferred. The memory controller 10 transmits the part of the data after the address Addr.

After resuming the program sequence, the memory controller 10 may not have to transmit all of the page selection command Csel_1, the data input command Cdin, and the address Addr. In this case, the memory chip 22 is required to be configured to retain in it the column address at the point of suspension of the program sequence.

It should be noted that the program sequence may not be resumed at the head data among the data that has not transferred before the suspension. In other words, a part of the data that is transmitted after resumption of the program sequence may include data that has been transferred by the suspension of the program sequence.

Figure 11:
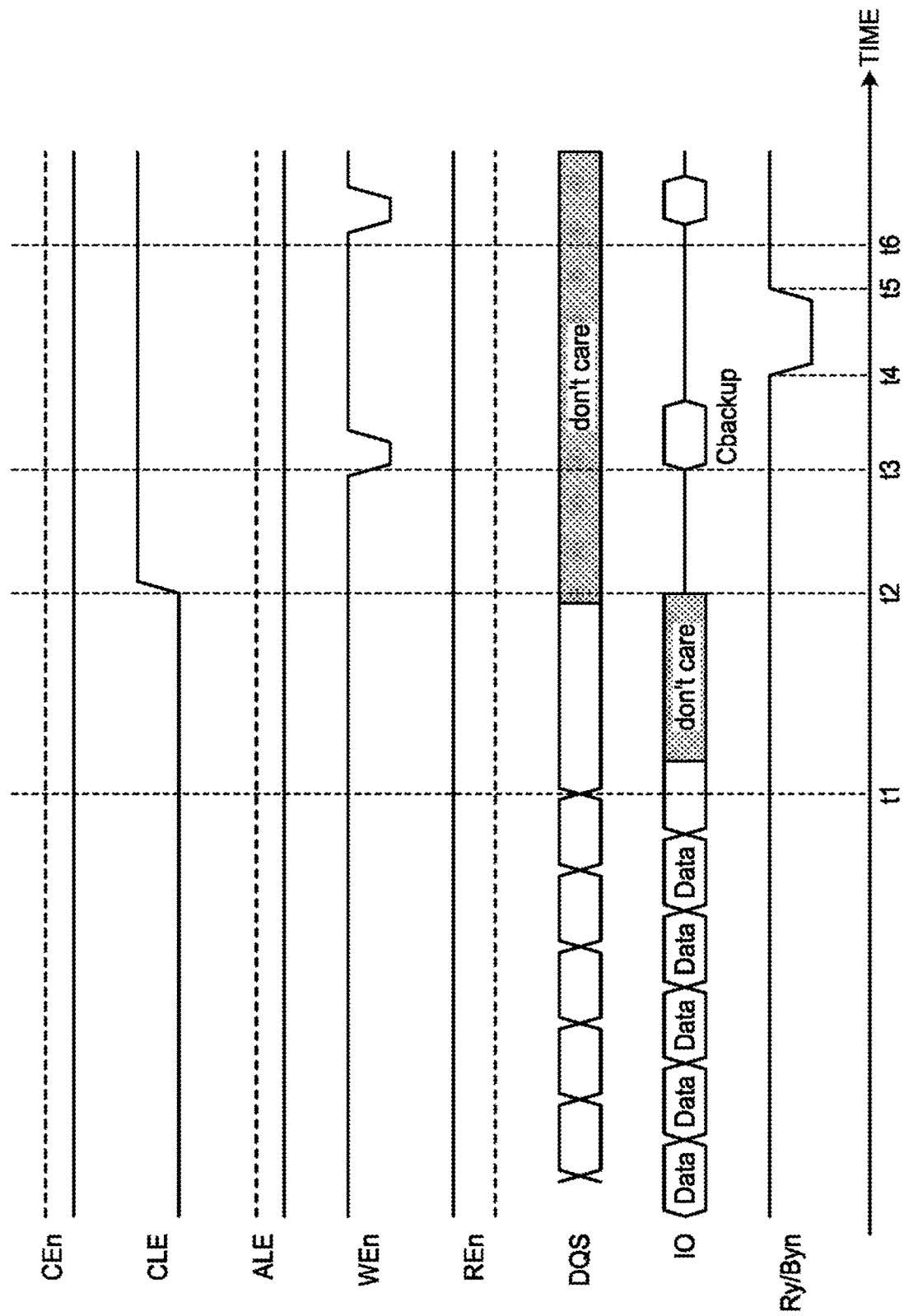
FIG. 11 is a view illustrating an example of waveforms of various signal lines according to the first embodiment in a case where the memory controller suspends data transfer and saves data.

FIG. 11 is a view illustrating an example of waveforms of signal lines in a case where the memory controller 10 suspends the data transfer and executes the save process. In the drawing, waveforms of a CEn signal line, a CLE signal line, an ALE signal line, a WEn signal line, a REn signal line, a DQS signal line, an IO signal line, a Ry/Byn signal line are illustrated.

In the example illustrated in FIG. 11, the CEn signal line and the WEn signal line are designed as a negative logic. In the periods illustrated in the drawing, the CEn signal line is always retained in an active state. In addition, the CLE signal line and the ALE signal line are designed as a positive logic. The DQS signal line is designed to transfer a DQS signal and an inverted signal of the DQS signal. The Ry/Byn signal line is designed so that a high state corresponds to a ready state (Ry) and a low state corresponds to a busy state (By). It should be noted that design of the respective signal lines is not limited to the above-described design.

A NAND controller 14 toggles the DQS signal line in data transfer (Data In). The NAND controller 14 suspends the data transfer by stopping toggling of the DQS signal (at t1). The NAND controller 14 asserts the CLE signal line to enable command transmission (at t2), and transmits a backup command (at t3). The NAND controller 14 negates the WEn signal line to allow the access circuit 27 to acquire the backup command. In response to the backup command, the access circuit 27 executes the acquired backup command. In execution of the backup command, the access circuit 27 sets a state of the Ry/Byn signal line to the busy state (t4 to t5). After the Ry/Byn signal line returns to the ready state, the NAND controller 14 initiates a read sequence (at t6).

Figure 12:
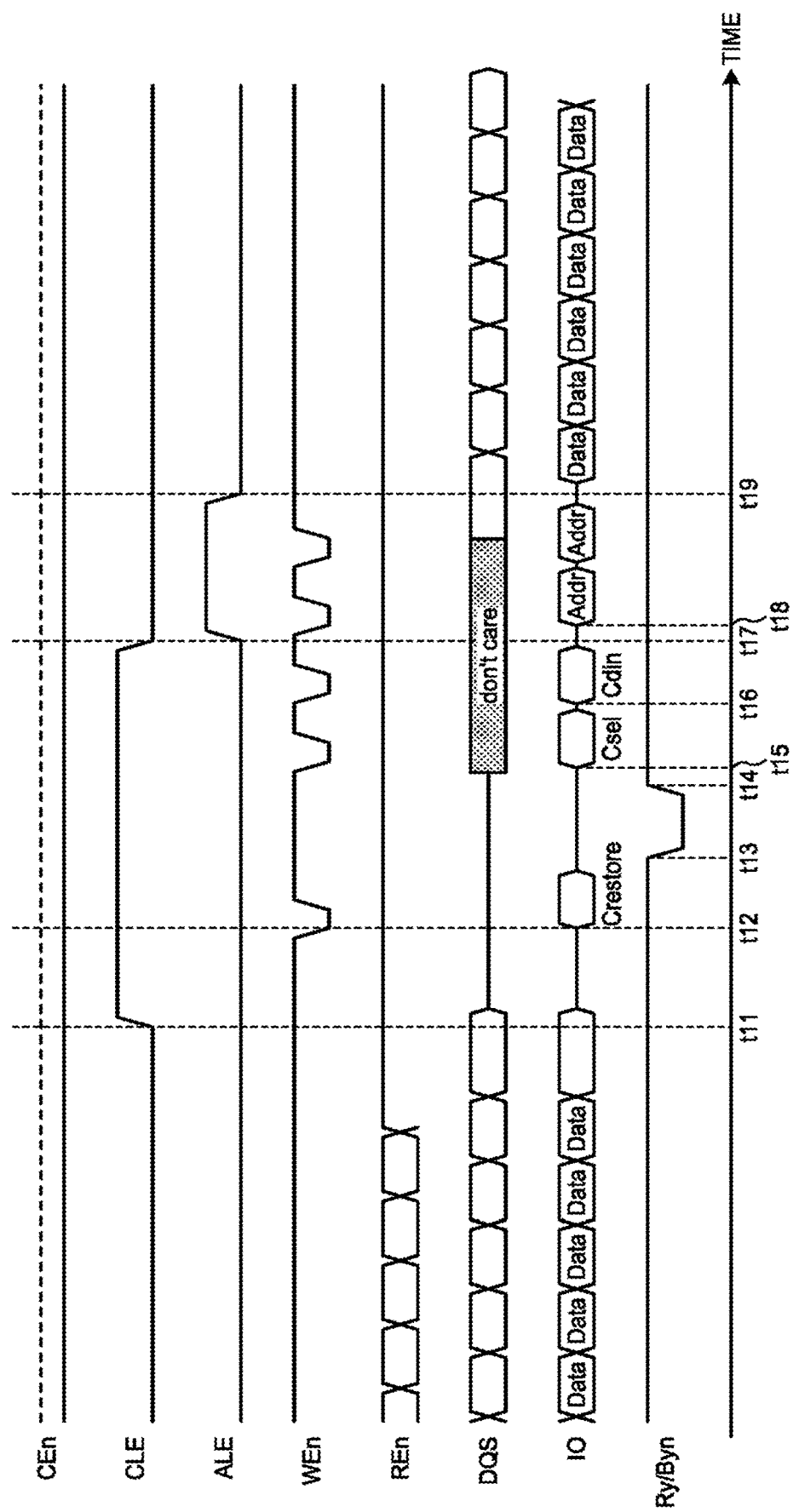
FIG. 12 is a view illustrating an example of waveforms of various signal lines according to the first embodiment in a case where the memory controller restores data and resumes data transfer.

FIG. 12 is a view illustrating an example of waveforms of signal lines in a case where the memory controller 10 executes the restoration process and resumes the data transfer. In a Data Out operation, a NAND controller 14 toggles the REn signal line. The access circuit 27 toggles the DQS signal line on the basis of the toggling of the REn signal line. After the Data Out operation in the read sequence is completed, the NAND controller 14 asserts the CLE signal line to enable command transmission (at t11). Then, the NAND controller 14 transmits a restore command (at t12). The NAND controller 14 negates the WEn signal line to allow the access circuit 27 to acquire the restore command. In response to the restore command, the access circuit 27 executes the acquired restore command. In execution of the restore command, the access circuit 27 sets the state of the Ry/Byn signal line to the busy state (t13 to t14). After the Ry/Byn signal line returns to the ready state, the NAND controller 14 resumes the program sequence (at t15).

After resuming the program sequence, the NAND controller 14 transmits a page selection command Csel (at t15), a data input command Cdin (at t16), and an address (including a column address) (at t18). The NAND controller 14 negates the CLE signal line and asserts the ALE signal line at timing (t17) between transmission timings of the data input command Cdin and the address. Accordingly, command transmission becomes to be forbidden, and address transmission becomes to be allowed. After transmitting the page selection command Csel, the data input command Cdin, and the address, the NAND controller 14 negates the WEn signal lines to allow the access circuit 27 to acquire respective pieces of information.

After the address transmission is completed, the NAND controller 14 negates the ALE signal line (at t19), and resumes the data transfer.

Figure 13:
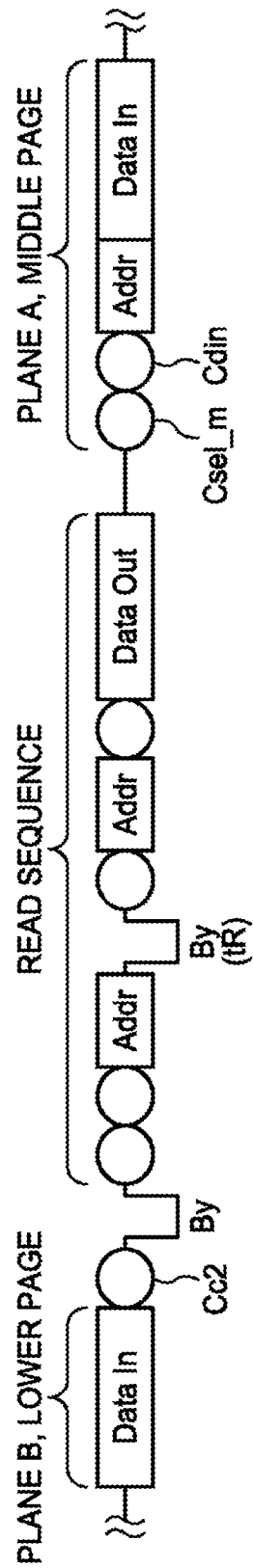
FIG. 13 is a view illustrating an example of the control sequence according to the first embodiment in a case where data save/restoration processes are not performed.

FIG. 13 is a view illustrating an example of a control sequence in a case where the save/restoration processes are not performed. FIG. 13 illustrates a control sequence in a case where the program sequence is suspended in a period after completion of transfer of data for lower page of the plane B before data for subsequent plane A is input (period 205 in FIG. 6).

When execution of a second completion command Cc2 is completed, the transfer buffer 24A and the transfer buffer 24B become empty. After transmission of the second completion command Cc2, the memory controller 10 initiates a read sequence without transmitting a backup command Crestore after the Ry/Byn signal line returns to the ready state from the busy state. After the read sequence is completed, the memory controller 10 executes a series of sequences for transfer of data for middle page of the plane A.

Figure 14:
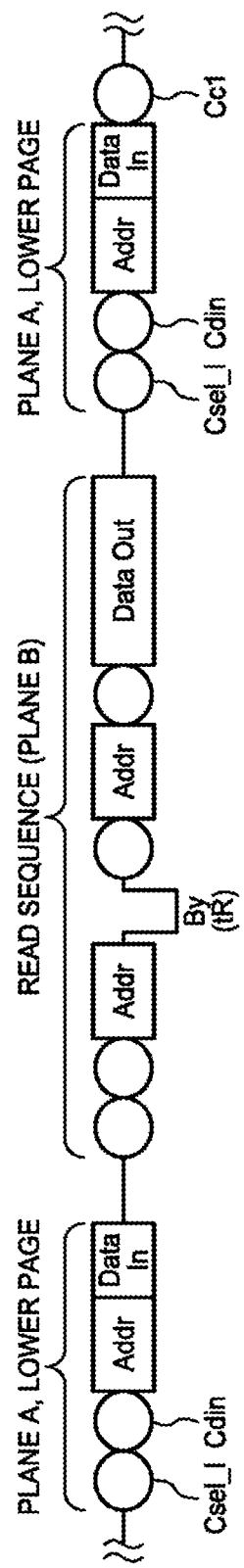
FIG. 14 is a view illustrating another example of the control sequence according to the first embodiment in the case where the data save/restoration processes are not performed.

FIG. 14 is a view illustrating another example of the control sequence in a case where the save/restoration processes are not performed. FIG. 14 illustrates a control sequence in a case where a read sequence in which the plane B is a read source is executed during transfer of data for lower page of the plane A (that is, in the period 202 in FIG. 6).

In the example illustrated in the drawing, the transfer buffer 24B that is empty is to be used in the read sequence. Accordingly, after suspending the data transfer for lower page of the plane A, the memory controller 10 initiates the read sequence without transmitting a backup command Cbackup. After the read sequence is completed, the memory controller 10 resumes the program sequence without transmitting a restore command Crestore.

Similarly as in the example illustrated in FIG. 10, after resuming the program sequence, the memory controller 10 transmits a page selection command Csel_1, a data input command Cdin, and an address (including a column address). Alternatively, transmitting at least one of the page selection command Csel_1, the data input command Cdin, and the address (column address) may be omitted.

Hereinbefore, an example in which a memory chip 22 includes two planes, and three-page data is programmed to each of the planes has been described. However, the number of the planes included in the memory chip 22 is not limited to two. In addition, the number of planes to which a program is executed in one program sequence is not limited to two. In addition, the amount of data, which is programmed to each plane in one program sequence, is not limited to three pages. In addition, the order of data transfer is not limited to the order of data for plane A and data for plane B. In addition, the order of data transfer is not limited to the order of data for lower page, data for middle page, and data for upper page. The memory controller 10 determines whether or not to suspend a program sequence on the basis of whether or not the current process is in the transfer phase regardless of the number of planes included in the memory chip 22, the number of planes as a program target, and the amount of data that is programmed to each plane. In addition, the memory controller 10 determines whether to execute the save/restoration processes in correspondence with whether or not the transfer buffer 24 to be used in a read sequence is empty regardless of the number of planes included in a memory chip 22, the number of planes as a program target, and the amount of data that is programmed to each plane.

Hereinbefore, description has been made on the assumption that the NAND memory 20 has a structure in which the NAND strings NS are provided in parallel to a substrate. The NAND memory 20 may have a three-dimensional structure in which the NAND strings NS are provided to be perpendicular to the substrate.

As described above, in the first embodiment, the memory controller 10 suspends a program sequence in a transfer phase, and executes a read sequence of reading data from the memory cell array 23. In addition, the memory controller 10 resumes the program sequence after execution of the read sequence. Even after the program sequence is initiated, the memory system 1 can initiate the read sequence before initiation of a program phase, and thus latency for a read request from the host 2 is shortened.

In addition, in the first embodiment, the memory chip 22 includes the transfer buffer 24 for data transfer between the memory chip 22 and the memory controller 10, and the backup buffer 26. In a case where data having been transferred by the point of suspending the program sequence exists in the transfer buffer 24 to be used in the read sequence, the access circuit 27 saves the data into the backup buffer 26. Then, after completion of the saving, the access circuit 27 transfers data, which is read from the memory cell array 23, to the memory controller 10 through the transfer buffer 24. Then, after completion of the transfer, the access circuit 27 restores the data, which has been saved in the backup buffer 26, to the transfer buffer 24. According to this configuration, after completion of the read sequence, the memory controller 10 resumes the data transfer from the point of suspending the program sequence. Accordingly, a total time necessary for the program sequence can be shortened further than in a case where the memory controller 10 retransfers data that has been transferred already.

In addition, in the first embodiment, in a case where data having been transferred by the point of suspending the program sequence exists in the transfer buffer 24 to be used in the read sequence, the memory controller 10 saves a content of the transfer buffer 24 into the backup buffer 26. In a case where data having been transferred by the point of suspending the program sequence does not exist in the transfer buffer 24 to be used in the read sequence, the memory controller 10 does not save the content of the transfer buffer 24 into the backup buffer 26. Thus, frequency of executing the save process is reduced, and accordingly a time necessary for suspending and resuming a programming sequence can be shortened. In addition, power consumption necessary for suspending and resuming the programming sequence can be reduced.

Second Embodiment

In the first embodiment, an example in which the memory controller 10 is configured to suspend a program sequence at any timing in a transfer phase has been described. A timing for suspending a program sequence may be further restricted. In a second embodiment, an example in which the timing for suspending the program sequence is further restricted will be described.

Figure 15:
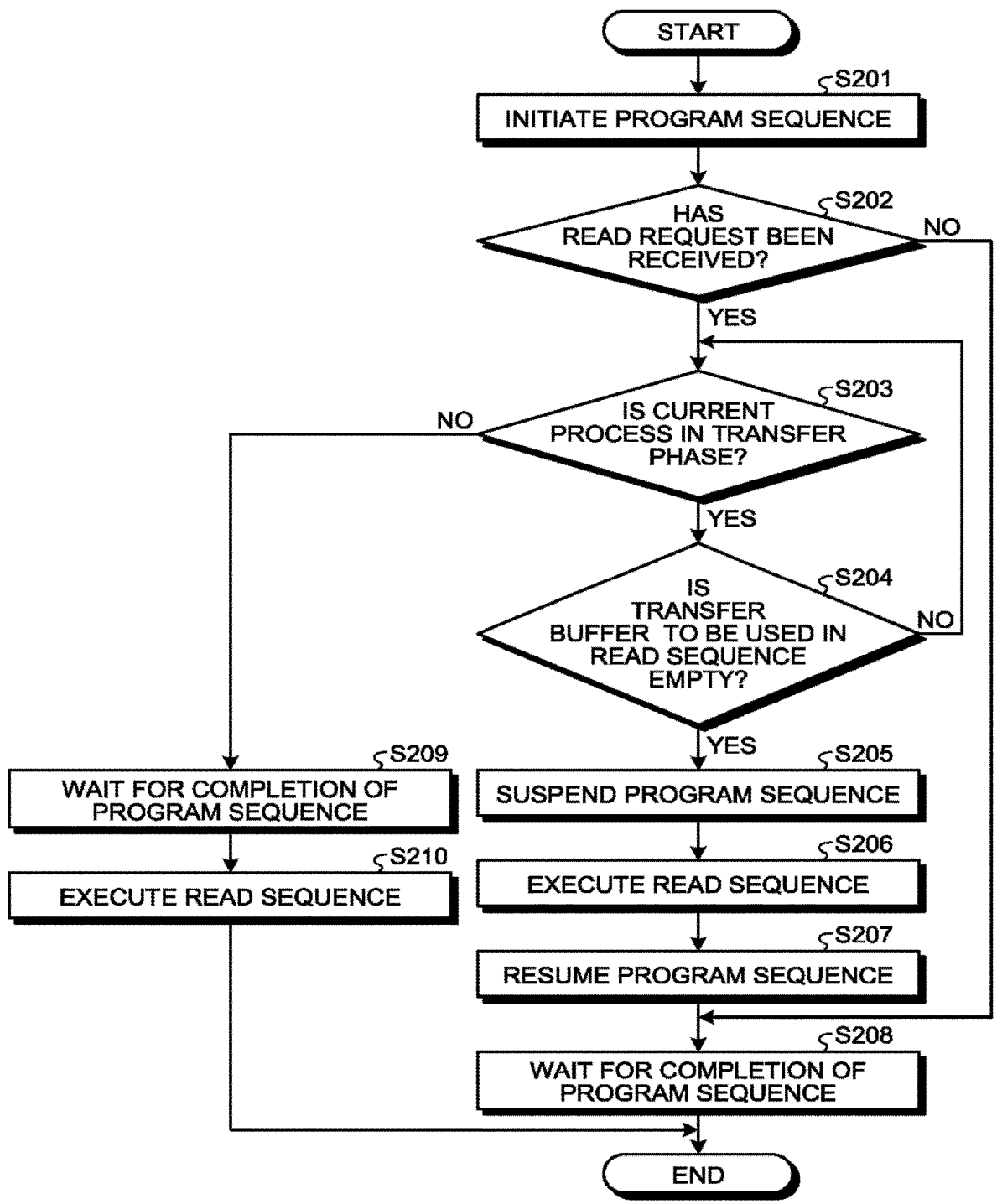
FIG. 15 is a flowchart illustrating an operation of a memory system according to a second embodiment.

FIG. 15 is a flowchart illustrating an operation of a memory system 1 according to the second embodiment. Here, operations different from the operation of the first embodiment will be mainly described.

First, the memory controller 10 initiates a program sequence (S201). After initiation of the program sequence, when receiving a read request from the host 2 (S202, Yes), the memory controller 10 determines whether or not the current process is in the transfer phase (S203).

In a case where the current process is in the transfer phase (S203, Yes), the memory controller 10 determines whether or not a transfer buffer 24 to be used in a read sequence is empty (S204).

In S204, the memory controller 10 determines that the transfer buffer 24 to be used in the read sequence is empty, in a case where both of the transfer buffer 24A and the transfer buffer 24B are empty, and in a case where the transfer buffer 24B is empty and only the plane B is a read source. In other cases, the memory controller 10 determines that the transfer buffer 24 to be used in the read sequence is not empty.

In a case where the transfer buffer 24 to be used in the read sequence is empty (S204, Yes), the memory controller 10 suspends the program sequence (S205) and executes the read sequence (S206). After the read sequence is completed, the memory controller 10 resumes the program sequence (S207). When the program sequence is completed (S208), a series of operations are completed.

In a case where the transfer buffer 24 to be used in the read sequence is not empty (S204, No), the memory controller 10 continues the program sequence, and then executes the process in S203 again. That is, the memory controller 10 waits for the transfer buffer 24 that is to be used in the read sequence to be empty.

In the determination process in S203, in a case where it is determined that the process is not in the transfer phase (S203, No), the memory controller 10 continues the program sequence. Then, after the program sequence is completed (S209), the memory controller 10 executes the read sequence (S210), and a series of operations are completed.

As described above, in a case where the transfer buffer 24 to be used in the read sequence is empty, the memory controller 10 executes the read sequence by suspending the program sequence. In a case where the transfer buffer 24 to be used in the read sequence is not empty, the memory controller 10 continues the program sequence. Accordingly, save/restoration processes may be unnecessary.

In addition, in a case where the transfer buffer 24 to be used in the read sequence is not empty, the memory controller 10 continues the program sequence until the transfer buffer 24 to be used in the read sequence becomes empty. In a case where the transfer buffer 24 to be used in the read sequence becomes empty during the program sequence, the memory controller 10 suspends the program sequence and then executes the read sequence. Accordingly, the save/restoration processes may be unnecessary.

In addition, in the process in S204, in a case where it is determined that the transfer buffer 24 to be used in the read sequence is not empty, the memory controller 10 may postpone initiating the read sequence until the program sequence is completed.

As described above, the memory controller 10 may be configured to suspend the program sequence only at a timing when the save/restoration processes are unnecessary.

Third Embodiment

In a third embodiment, another example in which a timing for suspending a program sequence is further restricted will be described.

Figure 16:
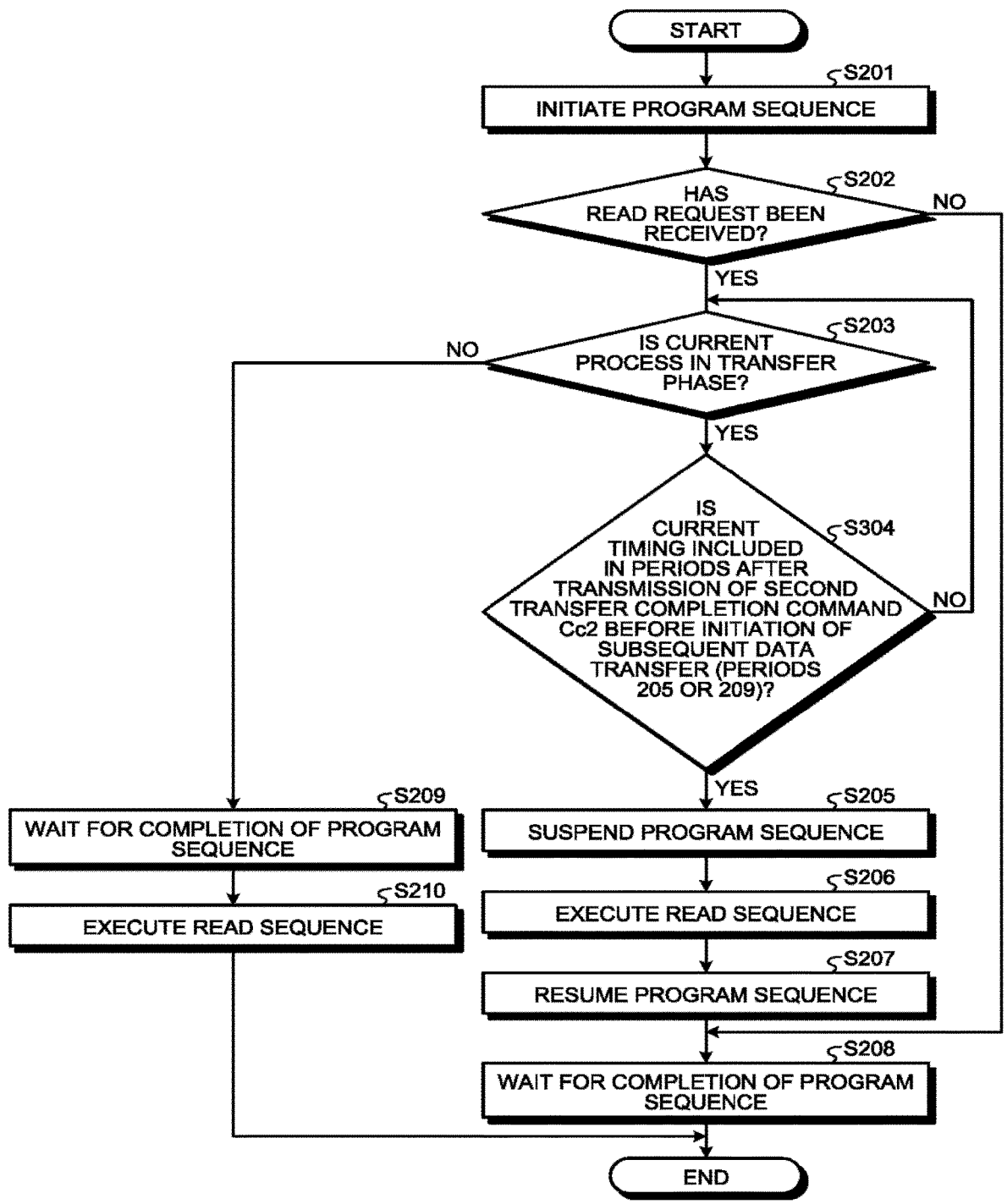
FIG. 16 is a flowchart illustrating an operation of a memory system according to a third embodiment.

FIG. 16 is a flowchart illustrating an operation of a memory system 1 according to the third embodiment. Among processes illustrated in the drawing, the same step number as in the second embodiment is given to the same process as the process executed in the second embodiment.

In the third embodiment, the process in S304 is performed instead of the process in S204. In S304, the memory controller 10 determines that the current timing is included in a period after transmission of a second completion command Cc2 before initiation of transfer of subsequent data (the period 205 or the period 209 in FIG. 7). In a case where the current timing is included in the above-described period (S304, Yes), save/restoration processes are not necessary, and thus the memory controller 10 proceeds to the process in S205. In a case where current timing is not included in the above-described period (S304, No), the memory controller 10 proceeds to the process in S203.

As described above, according to the third embodiment, the memory controller 10 suspends the program sequence only in a period after transmission of a second completion command Cc2 before initiation of transfer of data for subsequent plane (plane A).

That is, the memory controller 10 transmits a second completion command Cc2 to allow the access circuit 27 to acquire a content of the transfer buffer 24 into the intermediate buffer 25, and then executes a read sequence. After execution of the read sequence, the memory controller 10 transmits data for subsequent page to the transfer buffer 24. Then, the memory controller 10 transmits a program execution command Cprog to allow the access circuit 27 to execute the program of data.

According to this configuration, the memory controller 10 can execute a read sequence without the save/restoration processes.

It should be noted that, in addition to a case where the current timing is included in the period after transmission of the second completion command Cc2 before initiation of transfer of subsequent data, even in a case where the current timing is included in a period before initiation of transfer of first data after initiation of the program sequence (the period 201 in FIG. 7), the memory controller 10 may proceed to the process in S205.

In addition, in the process in S304, in a case where it is determined that the current timing is not included in the period after transmission of the second completion command Cc2 before initiation of transfer of subsequent data (S304, No), the memory controller 10 may postpone initiating the read sequence until the program sequence is completed.

Fourth Embodiment

In a fourth embodiment, still another example in which the timing for suspending a program sequence is further restricted will be described.

FIG. 17 is a flowchart illustrating an operation of a memory system 1 according to the fourth embodiment. In a series of processes illustrated in the drawing, the same step number as in the second embodiment is given to the same process as the process executed in the second embodiment.

In the fourth embodiment, the process in S404, the process in S405, and the process in S406 are performed instead of the process in S204.

In S404, the memory controller 10 determines whether or not the current timing is included in a period after transmission of a second completion command Cc2 before initiation of transfer of subsequent data (that is, the period 205 or the period 209 in FIG. 7). In a case where the current timing is included in the above-described period (S404, Yes), save/restoration processes are not necessary, and thus the memory controller 10 proceeds to the process in S205.

In a case where the current timing is not included in the above-described period (S404, No), the memory controller 10 determines whether or not the current timing is included in a period after transmission of a first completion command Cc1 (S405) before initiation of transfer of subsequent data (that is, the period 203, the period 207, or the period 211 in FIG. 7). In a case where the current timing is included in the above-described period (S405, Yes), the memory controller 10 determines whether or not the plane A corresponds to a read source (S406).

In a case where the plane A corresponds to the read source (S406, Yes), the memory controller 10 proceeds to the process in S203. In a case where the plane A does not correspond to the read source (S406, No), the save/restoration processes are not necessary, and thus the memory controller 10 proceeds to the process in S205.

In a case where the current timing is not included in the period after transmission of the first completion command Cc1 before initiation of transfer of the subsequent data (S405, No), the memory controller 10 proceeds to the process in S203.

As described above, in the fourth embodiment, in a case where a transfer buffer 24 to be used in the read sequence is empty, the memory controller 10 suspends the program sequence in a period after completion of transfer of data for one plane before initiation of transfer of data for subsequent plane. Accordingly, the memory controller 10 can execute the read sequence without the save/restoration processes.

Furthermore, even in a case where the transfer buffer 24 to be used in the read sequence is not empty, in a period after completion of transfer of data for one plane before initiation of transfer of data for subsequent plane, the memory controller 10 may suspend the program sequence, and execute the read sequence. In this case, the memory controller 10 saves a content of the transfer buffer 24 to be used in the read sequence into the backup buffer 26, and executes the read sequence after the saving. Then the memory controller 10 restores the content of the backup buffer 26 to the transfer buffer 24 after execution of the read sequence.

It should be noted that, as in the third embodiment, even in a case where the current timing is included in a period before initiation of transfer of first data after initiation of the program sequence (that is, the period 201 in FIG. 7), the memory controller 10 may proceed to the process in S205.

Fifth Embodiment

In the first embodiment, after suspending a program sequence, in a case where a transfer buffer 24 to be used in a read sequence is not empty, the memory controller 10 save a content of the transfer buffer 24. A method of determining the transfer buffer 24 for which save process is executed is not limited thereto.

FIGS. 18 to 20 are views illustrating modified examples of a save rule. FIGS. 18 to 20 illustrate a relationship between plane(s) that are read sources, transfer buffer(s) 24 that are empty, and transfer buffer(s) 24 for which save process is executed.

According to the example illustrated in FIG. 18, the memory controller 10 saves contents of the entirety of transfer buffers 24 into corresponding backup buffers 26 regardless of whether or not each of the transfer buffers 24 is empty. The memory controller 10 restores the contents of the entirety of the backup buffers 26 to the corresponding transfer buffers 24 after completion of the read sequence.

According to an example illustrated in FIG. 19, the memory controller 10 determines a transfer buffer 24 that is not empty, and saves a content of the determined transfer buffer 24 into a corresponding backup buffer 26 regardless of whether or not the determined transfer buffer 24 is to be used in the read sequence. After completion of the read sequence, the memory controller 10 restores the content which has been saved in the backup buffer 26, to the corresponding transfer buffer 24.

According to the example illustrated in FIG. 20, the memory controller 10 determines the transfer buffer 24 to be used in a read sequence, and saves a content of the specified transfer buffer 24 into a corresponding backup buffer 26 regardless of whether or not the determined transfer buffer 24 is empty. However, in a case where the entirety of transfer buffers 24 are empty, the memory controller 10 does not have to execute the save/restoration processes. After completion of the read sequence, the memory controller 10 restores the content, which has been saved in the backup buffer 26, to a corresponding transfer buffer 24. It should be noted that, even in a case where the entirety of transfer buffers 24 are empty, the memory controller 10 may determine the transfer buffer 24 to be used in the read sequence, and save a content of the determined transfer buffer 24 into a corresponding backup buffer 26.

As described above, a method of determining the transfer buffer 24 for which the save/restoration processes are executed may be modified in various manners. According to the determination method described in the fifth embodiment, an algorithm of selecting the transfer buffer 24 for which the save process is executed becomes simpler than the first embodiment.

Sixth Embodiment

In the above-described embodiments, examples in which the memory controller 10 suspends a program sequence and executes one read sequence have been described. The memory controller 10 may suspend the program sequence and then execute two or more read sequences.

In a sixth embodiment, an example in which the memory controller 10 suspends a program sequence, and executes a first read sequence of reading data from the plane A, a second read sequence of reading data from the plane B, and a third read sequence of reading data from the plane A in this order, will be described.

Figure 21:
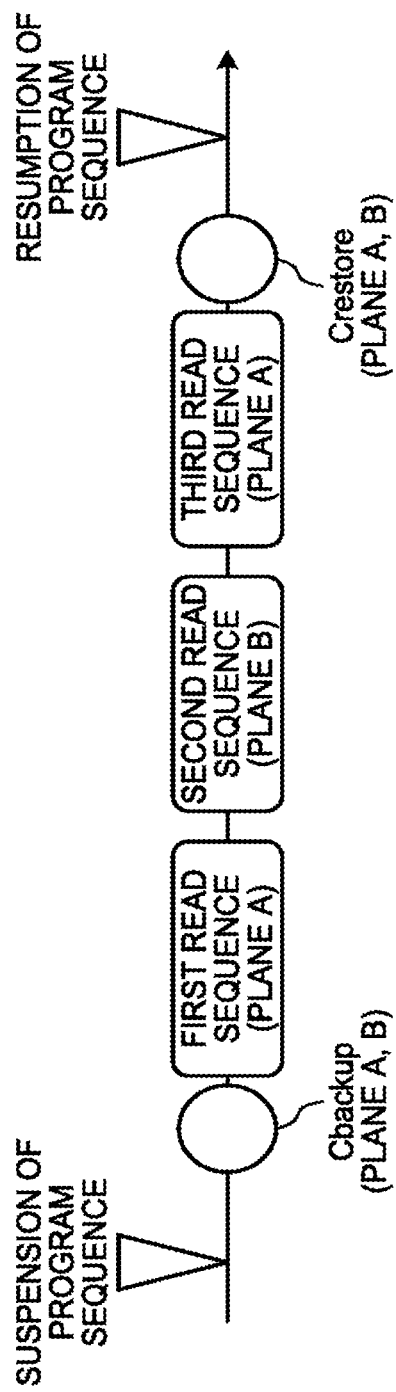
FIG. 21 is a schematic view illustrating an example of a control sequence according to a sixth embodiment.

FIG. 21 is a schematic view illustrating an example of a control sequence according to the sixth embodiment. FIG. 21 illustrates a control sequence after initiation of the program sequence.

After suspending the program sequence, the memory controller 10 transmits a backup command Cbackup, which designates the plane A and the plane B, to a memory chip 22, and saves contents of the entirety of transfer buffers 24, which are to be used in the three read sequences, into the backup buffers 26. Here, the transfer buffer 24A is to be used in the first read sequence and the third read sequence, and the transfer buffer 24B is to be used in the second read sequence, and thus the memory controller 10 saves the contents of the transfer buffer 24A and the transfer buffer 24B. After the saving, the memory controller 10 executes the first read sequence, the second read sequence, and the third read sequence in this order. After completion of the entirety of read sequences, the memory controller 10 transmits a restore command Crestore designating the plane A and the plane B to restore the contents of the transfer buffer 24A and the transfer buffer 24B which have been saved in the backup buffers 26.

As described above, in the case of executing a plurality of read sequences in a transfer phase, the memory controller 10 transmits the backup command Cbackup once before initiation of the plurality of read sequences, and transmits the restore command Crestore after completion of the plurality of read sequences.

It should be noted that, various save rules may be employed. For example, the memory controller 10 may save contents of the entirety of transfer buffers 24 regardless of whether or not the transfer buffers 24 are to be used in the plurality of read sequences. In addition, the memory controller 10 may save a content of the transfer buffer 24 to be used in any one of the plurality of read sequences, and may not have to save a content of the transfer buffer 24 not to be used in any one of the plurality of read sequences. In addition, the memory controller 10 may save a content of the transfer buffer 24 that is not empty, and may not have to save a content of the transfer buffer 24 that is empty. In addition, the memory controller 10 may save a content of the transfer buffer 24 that is to be used in any one of the plurality of read sequences and is not empty, and may not have to save a content of the transfer buffer 24 that is not to be used in any one of the plurality of read sequences or is empty.

FIG. 22 is a schematic view illustrating another example of the control sequence according to the sixth embodiment. As illustrated in the drawing, the memory controller 10 may perform save/restoration processes for each read sequence. Even in the control sequence exemplified in the drawing, various save rules may be employed.

For example, the memory controller 10 may save a content of the transfer buffer 24 to be used in a read sequence immediately before the read sequence starts, and may restore the saved content to the transfer buffer 24 after completion of the read sequence. In addition, the memory controller 10 may save contents of the entirety of transfer buffers 24 regardless of whether or not the transfer buffers 24 are to be used. In addition, the memory controller 10 may save a content of the transfer buffer 24 to be used in a read sequence immediately before the read sequence starts, and may not have to save a content of the transfer buffer 24 not to be used in the read sequence. In addition, the memory controller 10 may save a content of the transfer buffer 24 that is to be used in a read sequence and is not empty, and may not have to save a content of the transfer buffer 24 that is not to be used in the read sequence or is empty.

FIG. 23 is a schematic view illustrating still another example of the control sequence according to the sixth embodiment. As illustrated in the drawing, the memory controller 10 may execute the save process for each of the read sequences, and may execute the restoration process after completion of the entirety of read sequences. The memory controller 10 saves a content of the transfer buffer 24A upon executing the read sequence that uses the transfer buffer 24A for the first time after suspending the program sequence (that is, upon executing the first read sequence). In addition, the memory controller 10 saves a content of the transfer buffer 24B upon executing the read sequence that uses the transfer buffer 24B for the first time after suspending the program sequence (that is, upon executing the second read sequence). In addition, the memory controller 10 restores the entirety of saved contents all together after completion of execution of the entirety of read sequences.

Furthermore, even in the control sequence exemplified in FIG. 23, various save rules may be employed. For example, even upon executing the read sequence that uses the transfer buffer 24A for the first time after suspending the program sequence, in a case where the transfer buffer 24A is empty, the memory controller 10 may not have to save a content of the transfer buffer 24A.

Seventh Embodiment

In the first to sixth embodiments, the memory controller 10 determines whether or not save/restoration processes are necessary. Each memory chip 22 may determine whether or not the save/restoration processes are necessary, and may execute the save/restoration processes.

For example, in a transfer phase of a program sequence, the memory controller 10 initiates a read sequence by suspending the program sequence. In a memory chip 22, the access circuit 27 may track progress of the data transfer, and the progress of the program sequence including a plane that is a program destination of the data transfer, by counting the amount of transferred data or the column addresses. When the read sequence is initiated, the access circuit 27 determines whether or not the save/restoration processes for a content of the transfer buffer 24 are necessary on the basis of any save rule (for example, any rule among the save rules described in the first to sixth embodiments). In a case where it is determined that the save/restoration processes for the content of the transfer buffer 24 are necessary, the access circuit 27 saves the content of the transfer buffer 24 into a corresponding backup buffer 26 before execution of the read sequence. The access circuit 27 restores the content, which has been saved in the backup buffer 26, into the transfer buffer 24 after completion of the read sequence.

The access circuit 27 may be capable of receiving a read command in the transfer phase. In the case of receiving the read command in the transfer phase, the access circuit 27 suspends the transfer phase and executes a read sequence. After completion of the read sequence, the access circuit 27 resumes the transfer phase. In suspension/resumption of the transfer phase, the access circuit 27 may execute the save/restoration processes, or may postpone initiating the read sequence until the transfer buffer 24 to be used in the read sequence becomes empty.

As described above, the memory system 1 may be configured so that the memory chip 22 determines whether or not the save/restoration processes are necessary.

Eighth Embodiment

FIG. 24 is a schematic view illustrating an example of a control sequence according to an eighth embodiment. FIG. 24 illustrates the control sequence starting with (E) in FIG. 5.

As illustrated in FIG. 24, the memory controller 10 transmits a suspend command Csuspend in a case where a state of a Ry/Byn signal line is in a program busy state. Upon receiving the suspend command Csuspend, the access circuit 27 stops program process. After stopping the program process, the access circuit 27 transitions the state of the Ry/Byn signal line from the program busy state to a ready state.

After the state of the Ry/Byn signal line transitions from the program busy state to the ready state, the memory controller 10 initiates the read sequence. After the read sequence is completed, the memory controller 10 transmits a resume command Cresume. Upon receiving the resume command Cresume, the access circuit 27 resumes the program process. When the program process is completed, the access circuit 27 transitions the state of the Ry/Byn signal line from the program busy state to the ready state.

After the Ry/Byn signal transitions from the program busy state to the ready state, the NAND controller 14 transmits a command Cstatus for reading out status information. The access circuit 27 transmits the status information as a response to the NAND controller 14.

As described above, the memory system 1 may be configured so that the program phase can be suspended. Furthermore, the eighth embodiment is applicable to the memory systems 1 according to the first to seventh embodiments.

As described in the first to eighth embodiments, the memory controller 10 can execute a read sequence by suspending the program sequence before transition to the program phase (that is, in the transfer phase). Accordingly, latency for a read request is shortened further than in a case where the read sequence cannot be initiated until execution of the program sequence is completed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
a non-volatile memory including a memory cell array; and
a controller configured to
control a transfer phase in which a command, an address, and first data are transferred to the non-volatile memory, and a program phase in which the first data is programmed into the memory cell array by the non-volatile memory after the transfer phase,
suspend the transfer phase after initiating the transfer phase before completion of the transfer phase, then read second data from the non-volatile memory, and
resume the transfer phase after reading of the second data is completed,
wherein the non-volatile memory further includes a transfer buffer for data transfer between the non-volatile memory and the controller, and a backup buffer, and
the non-volatile memory is configured to
save third data stored in the transfer buffer into the backup buffer after the suspension of the transfer phase,
transfer the second data from the memory cell array to the controller through the transfer buffer after completion of the saving of the third data, the third data being at least a part of the first data having been transferred to the transfer buffer by a timing of the suspension, and
restore the third data saved in the backup buffer to the transfer buffer after completion of the transfer of the second data.

2. The memory system according to claim 1,
wherein the memory cell array includes a plurality of sub-arrays,
the transfer buffer includes a plurality of first transfer buffers which respectively correspond to the sub-arrays different from each other, and
the non-volatile memory is configured to save a content of each of the plurality of first transfer buffers into the backup buffer regardless of whether or not the third data is stored in each of the plurality of first transfer buffers.

3. The memory system according to claim 1,
wherein the memory cell array includes a plurality of sub-arrays,
the transfer buffer includes a plurality of first transfer buffers which respectively correspond to the sub-arrays different from each other,
the non-volatile memory is configured to save a content of a second transfer buffer among the plurality of first transfer buffers into the backup buffer, and not to save a content of a third transfer buffer among the plurality of first transfer buffers into the backup buffer,
the second transfer buffer is, among the plurality of first transfer buffers, a first transfer buffer in which at least a part of the third data is stored, and
the third transfer buffer is, among the plurality of first transfer buffers, a first transfer buffer in which the third data is not stored.

4. The memory system according to claim 1,
wherein the memory cell array includes a plurality of sub-arrays,
the transfer buffer includes a plurality of first transfer buffers which respectively correspond to the sub-arrays different from each other,
the non-volatile memory is configured to save a content of a second transfer buffer among the plurality of first transfer buffers into the backup buffer, and not to save a content of a third transfer buffer among the plurality of first transfer buffers into the backup buffer,
the second transfer buffer is, among the plurality of first transfer buffers, a first transfer buffer corresponding to a sub-array that is a read source of the second data among the plurality of sub-arrays, and
the third transfer buffer is, among the plurality of first transfer buffers, a first transfer buffer not corresponding to the sub-array that is the read source of the second data among the plurality of sub-arrays.

5. The memory system according to claim 1,
wherein the memory cell array includes a plurality of sub-arrays,
the transfer buffer includes a plurality of first transfer buffers which respectively correspond to the sub-arrays different from each other, and
the non-volatile memory is configured to save a content of a second transfer buffer among the plurality of first transfer buffers into the backup buffer, and not to save a content of a third transfer buffer among the plurality of first transfer buffers to the backup buffer,
the second transfer buffer is, among the plurality of first transfer buffers, a first transfer buffer in which the third data is stored and which corresponds to the sub-array that is a read source of the second data among the plurality of sub-arrays, and
the third transfer buffer is, among the plurality of first transfer buffers, a first transfer buffer in which the third data is not stored or which does not correspond to the sub-array that is the read source of the second data among the plurality of sub-arrays.

6. The memory system according to claim 1, wherein the controller is further configured to
transmit a read command to the non-volatile memory in the transfer phase, and
the non-volatile memory is configured to, in response to the read command in the transfer phase, save the third data into the backup buffer.

7. The memory system according to claim 1,
wherein the non-volatile memory is configured to postpone the suspension of the transfer phase until a timing at which the transfer buffer is empty.

8. The memory system according to claim 7,
wherein the non-volatile memory further includes an intermediate buffer,
the memory cell array includes a plurality of word lines,
each of the plurality of word lines includes a first storage area and a second storage area,
the first data includes fourth data and fifth data,
the fourth data is data of which a program destination is the first storage area of a first word line among the plurality of word lines,
the fifth data is data of which a program destination is the second storage area of the first word line, and
the controller is further configured to
transfer the fourth data to the transfer buffer,
cause the non-volatile memory to acquire the fourth data from the transfer buffer into the intermediate buffer after completion of the transfer of the fourth data before initiating transfer of the fifth data to the transfer buffer, and then transfer the fifth data to the transfer buffer, and cause, after completion of the transfer of the fifth data, the non-volatile memory to program, into the memory cell array, the fifth data and the fourth data that is acquired in the intermediate buffer, and the timing at which the transfer buffer is empty is a timing within a period, from a timing at which the fourth data has been acquired from the transfer buffer into the intermediate buffer, to a timing at which the fifth data is started to be transferred to the transfer buffer.

9. The memory system according to claim 8, wherein the controller is configured to, after the fourth data is acquired from the transfer buffer into the intermediate buffer, suspend the transfer phase, then acquire the second data from the memory cell array through the transfer buffer, and resume the transfer phase after the acquisition of the second data.

10. The memory system according to claim 7, wherein the non-volatile memory further includes an intermediate buffer, the memory cell array includes a plurality of word lines, each of the plurality of word lines includes a first storage area and a second storage area, the first data includes fourth data and fifth data, the fourth data is data of which a program destination is the first storage area of a first word line among the plurality of word lines, the fifth data is data of which a program destination is the second storage area of the first word line, and the timing at which the transfer buffer is empty is a timing within a period, from a timing at which the fourth data is acquired from the transfer buffer into the intermediate buffer, to a timing at which the fifth data is started to be transferred to the transfer buffer.

11. The memory system according to claim 7, wherein the memory cell array includes a plurality of memory cells each having capacity of a plurality of bits, the first data includes fourth data and fifth data, the fourth data containing a first bit among the plurality of bits, the fifth data containing a second bit among the plurality of bits, the second bit being different from the first bit, the fifth data is, in the transfer phase, transferred subsequently to the fourth data, and the timing at which the transfer buffer is empty is a timing within a period, from a timing at which transfer of the fourth data from the transfer buffer is completed, to a timing at which the fifth data is started to be transferred to the transfer buffer.

12. A memory system, comprising:

a non-volatile memory including a memory cell array; and a controller configured to control a transfer phase in which a command, an address, and first data are transferred to the non-volatile memory, and a program phase in which the first data is programmed into the memory cell array by the non-volatile memory after the transfer phase, suspend the transfer phase after initiating the transfer phase before completion of the transfer phase, then read second data from the non-volatile memory, and resume the transfer phase after reading of the second data is completed, wherein the non-volatile memory includes a transfer buffer for data transfer between the non-volatile memory and the controller, and an intermediate buffer, the memory cell array includes a plurality of word lines, each of the plurality of word lines includes a first storage area and a second storage area, the first data includes third data and fourth data, the third data is data of which a program destination is the first storage area of a first word line among the plurality of word lines, the fourth data is data of which a program destination is the second storage area of the first word line, and the controller is further configured to transfer the third data to the transfer buffer, instruct, after completion of the transfer of the third data before initiating transfer of the fourth data to the transfer buffer, the non-volatile memory to acquire the third data from the transfer buffer into the intermediate buffer and then acquire the second data from the memory cell array through the transfer buffer, transfer the fourth data to the transfer buffer after the acquisition of the second data, and cause, after completion of the transfer of the fourth data, the non-volatile memory to program the fourth data and the third data acquired in the intermediate buffer into the memory cell array.

13. The memory system according to claim 12, wherein each of the plurality of word lines includes a memory cell having capacity of a plurality of bits, the first storage area is constituted with a first bit among the plurality of bits, and the second storage area is constituted with a second bit different from the first bit among the plurality of bits.

14. The memory system according to claim 12, wherein the non-volatile memory is configured to postpone the suspension of the transfer phase until a timing at which the transfer buffer is empty, and the timing at which the transfer buffer is empty is a timing within a period, from a timing at which the third data has been acquired from the transfer buffer into the intermediate buffer, to a timing at which the fourth data is started to be transferred to the transfer buffer.

15. The memory system according to claim 14, wherein the controller is configured to after the third data is acquired from the transfer buffer into the intermediate buffer, suspend the transfer phase, then acquire the second data from the memory cell array through the transfer buffer, and resume the transfer phase after the acquisition of the second data.

16. A memory system, comprising:

a non-volatile memory including a memory cell array; and a controller configured to control a transfer phase in which a command, an address, and first data are transferred to the non-volatile memory, and a program phase in which the first data is programmed into the memory cell array by the non-volatile memory after the transfer phase, suspend the transfer phase after initiating the transfer phase before completion of the transfer phase, then read second data from the non-volatile memory, and resume the transfer phase after reading of the second data is completed, wherein the non-volatile memory further includes a transfer buffer for data transfer between the non-volatile memory and the controller, the memory cell array includes a plurality of sub-arrays, the transfer buffer includes a plurality of first transfer buffers which respectively correspond to the sub-arrays different from each other, the first data includes third data and fourth data, the third data is data of which a program destination is a first sub-array among the plurality of sub-arrays, the fourth data is data which, in the transfer phase, is transferred subsequently to the third data and of which a program destination is a second sub-array, the second sub-array being different from the first sub-array among the plurality of sub-arrays, and the controller is further configured to transfer the third data to a second transfer buffer, the second transfer buffer being, among the plurality of first transfer buffers, a first transfer buffer corresponding to the first sub-array, and suspend the transfer phase at a timing after completion of the transfer of the third data before initiating transfer of the fourth data to a third transfer buffer, the third transfer buffer being, among the plurality of first transfer buffers, a first transfer buffer corresponding to the second sub-array.

17. The memory system according to claim 16, wherein the controller is further configured to suspend the transfer phase in a case where fifth data is not stored in a fourth transfer buffer, the fourth transfer buffer is, among the plurality of first transfer buffers, a first transfer buffer corresponding to one sub-array that is a read source of the second data among the plurality of sub-arrays, and the fifth data is at least a part of the first data having been transferred by the timing of the suspension.

18. The memory system according to claim 16, wherein the non-volatile memory further includes a backup buffer, the controller is further configured to, in a case where fifth data is stored in a fourth transfer buffer after suspending the transfer phase, save the fifth data stored in the fourth transfer buffer into the backup buffer, acquire the second data from the memory cell array through the fourth transfer buffer after completion of the saving of the fifth data, and restore the fifth data saved in the backup buffer into the fourth transfer buffer after completion of the transfer of the second data, the fourth transfer buffer is, among the plurality of first transfer buffers, a first transfer buffer corresponding to a sub-array that is a read source of the second data among the plurality of sub-arrays, and the fifth data is a part of the first data having been transferred by the timing of the suspension.

19. The memory system according to claim 16, wherein the non-volatile memory is configured to postpone the suspension of the transfer phase until a timing at which the second transfer buffer is empty, the non-volatile memory further includes an intermediate buffer, the controller is further configured to cause the non-volatile memory to acquire the third data from the second transfer buffer into the intermediate buffer after completion of the transfer of the third data before initiating transfer of the fourth data to the third transfer buffer, and then transfer the fourth data to the transfer buffer, and cause, after completion of the transfer of the fourth data, the non-volatile memory to program, into the memory cell array, the fourth data and the third data that is acquired in the intermediate buffer, and the timing at which the second transfer buffer is empty is a timing within a period, from a timing at which the third data is acquired from the second transfer buffer into the intermediate buffer, to a timing at which the fourth data is started to be transferred to the third transfer buffer.

20. The memory system according to claim 16, wherein the non-volatile memory is configured to postpone the suspension of the transfer phase until a timing at which the transfer buffer is empty, the memory cell array includes a plurality of memory cells each having capacity of a plurality of bits, the first data includes fifth data and sixth data, the fifth data containing a first bit among the plurality of bits, the sixth data containing a second bit among the plurality of bits, the second bit being different from the first bit, the sixth data is, in the transfer phase, transferred subsequently to the fifth data, and the timing at which the transfer buffer is empty is a timing within a period, from a timing at which transfer of the fifth data from the transfer buffer is completed, to a timing at which the sixth data is started to be transferred to the transfer buffer.

* * * * *